(12) United States Patent
Qiao et al.

(10) Patent No.: US 10,649,806 B2
(45) Date of Patent: May 12, 2020

(54) ELASTIC MANAGEMENT OF MACHINE LEARNING COMPUTING

(71) Applicant: Petuum Inc., Pittsburgh, PA (US)

(72) Inventors: Aurick Qiao, Pittsburgh, PA (US); Qirong Ho, Pittsburgh, PA (US); Eric Xing, Pittsburgh, PA (US)

(73) Assignee: PETUUM, INC., Pittsburgh, PA (US)

( * ) Notice: Subject to any disclaimer, the term of this patent is extended or adjusted under 35 U.S.C. 154(b) by 135 days.

(21) Appl. No.: 15/951,088

(22) Filed: Apr. 11, 2018

(65) Prior Publication Data

US 2018/0300171 A1  Oct. 18, 2018

Related U.S. Application Data

(60) Provisional application No. 62/654,740, filed on Apr. 9, 2018, provisional application No. 62/484,834, filed on Apr. 12, 2017.

(51) Int. Cl.
*G06F 9/48* (2006.01)
*G06F 9/50* (2006.01)
(Continued)

(52) U.S. Cl.
CPC .............. *G06F 9/4843* (2013.01); *G06F 9/28* (2013.01); *G06F 9/5027* (2013.01);
(Continued)

(58) Field of Classification Search
CPC ........ G06F 9/4843; G06F 9/28; G06F 9/5027; G06F 9/5066; G06F 9/5088; G06N 20/00
See application file for complete search history.

(56) References Cited

U.S. PATENT DOCUMENTS

| 2006/0036889 A1* | 2/2006 | Arai ........................ G06F 11/00 714/1 |
| 2008/0235482 A1* | 9/2008 | Armstrong ............ G06F 9/4856 711/173 |

(Continued)

OTHER PUBLICATIONS

Xing et al. Petuum: A New Platform for Distributed Machine Learning on Big Data. [online] IEEE., pp. 49-67. Retrieved From the Internet <https://ieeexplore.ieee.org/abstract/document/7239545> (Year: 2015).*

(Continued)

*Primary Examiner* — Emerson C Puente
*Assistant Examiner* — Jonathan R Labud

(57) ABSTRACT

A computer system implemented a method for elastic resource management for executing a machine learning (ML) program. The system is configured to create a set of logical executors, assign them across a set of networked physical computation units of a distributed computing system, partition and distribute input data and Work Tasks across the set of logical executors, assign them across the set of networked physical computation units, where the Work Tasks are partitioned into short units of computation (micro-tasks), each calculates a partial update to the ML program's model parameters and each last for less than one second; create a set of logical servers (LSes); partition and distribute globally shared model parameters of the ML program across the set of logical servers; execute partitioned Work Tasks according to a bounded asynchronous parallel standard, where a current Work Task is allowed to execute with stale model parameters without having all the current calculation updates from Work Tasks it depend on, provided the staleness of the model parameters is within a predefined limit.

18 Claims, 11 Drawing Sheets

(51) Int. Cl.
*G06F 9/28* (2006.01)
*G06N 20/00* (2019.01)
(52) U.S. Cl.
CPC .......... *G06F 9/5066* (2013.01); *G06F 9/5088* (2013.01); *G06N 20/00* (2019.01)

(56) References Cited

U.S. PATENT DOCUMENTS

| | | | | |
|---|---|---|---|---|
| 2013/0117157 | A1* | 5/2013 | Iyoob | G06Q 30/06 705/26.41 |
| 2016/0358305 | A1* | 12/2016 | Banerjee | G06T 1/20 |
| 2018/0081720 | A1* | 3/2018 | Zlatanchev | G06F 9/4887 |
| 2018/0181390 | A1* | 6/2018 | Lepcha | G06F 9/28 |

OTHER PUBLICATIONS

Li et al. Parameter server for distributed machine learning. [online] Carnegie Mellon., pp. 1-10. Retrieved From the Internet—<http://www.cs.cmu.edu/~feixia/files/ps.pdf> (Year: 2013).*

Dai et al. Petuum: A Framework for Iterative-Convergent Distributed ML. [online] Carnegie Mellon., pp. 1-10. Retrieved From the Internet <https://kilthub.cmu.edu/articles/Petuunn_A_Framework_for_Iterative-Convergent_Distributed_ML/6476243/files/11907653.pdf> (Year: 2013).*

* cited by examiner

ELASTIC MANAGEMENT OF MACHINE LEARNING COMPUTING

CROSS REFERENCE TO OTHER APPLICATIONS

This application claims priority to Provisional Application Ser. No. 62/484,834, entitled "Elastic Management of Machine Learning Computing" filed on Apr. 12, 2017 and Provisional Application Ser. No. 62/654,740, entitled "Elastic Management of Machine Learning Computing" filed on Apr. 9, 2018, the contents of which are incorporated herein by reference in their entirety.

FIELD OF THE INVENTION

The present invention generally relates to elastic resource management for computing software applications in a distributed computing environment, and more particularly, to elastic resource management for computing machine learning software applications in a distributed computing environment.

BACKGROUND OF THE INVENTION

Machine learning (ML) is becoming an increasingly popular application in the cloud and datacenters. Current software for distributed ML leverages the specific properties of ML program to achieve high performance. However, such software is not elastically adaptable to the changing of computation resource availability in multi-user (or multi-tenant) environments such as modern clouds and datacenters in which they run, where the set of currently running jobs and available computation resources (CPU, memory, etc.) at any given time are constantly changing. It is therefore highly desirable for applications executing in such an environment to be elastic, being able to opportunistically use additional resources when offered, and gracefully cede acquired resources when requested.

Elasticity is beneficial for both the individual job and for the cluster as a whole. An elastic job can make use of idle resources to complete within a shorter amount of time, and avoid completely halting when some of its resources are evicted. A cluster-wide job scheduler can dynamically re-allocate resources to speed up urgent real-time or interactive jobs, and ensure fairness by preventing jobs from holding frequently requested resources for long periods of time.

SUMMARY OF THE INVENTION

The Applicants herein present a technical solution for executing machine learning (ML) algorithms (used interchangeably with ML programs or ML applications) in a distributed computation system (e.g., datacenter and cloud). One innovative aspect of the subject matter described in this specification can be embodied in systems implementing methods for executing machine ML algorithms in a distributed computing environment. Other embodiments of this aspect include corresponding apparatuses, devices, firmware, hardware, and/or software recorded on one or more computer storage devices, each or in combination configured to implement the systems and methods of the present invention.

In one aspect, the inventive solution (1) provides an expressive programming model for building, programming and/or modifying ML programs that support stateful workers (or logical executors having defined computation state) and are both staleness-aware and dependency-aware, and (2) provides a framework for efficiently executing the ML programs built with the aforementioned-programming model in an elastic fashion, being able to scale in (or scale down) or scale out (or scale up) according to changing resource demand with low overhead.

The inventive solution overcomes certain short comings of existing solutions for executing ML software programs in a distributed fashion. For example, existing solutions for executing distributed ML programs either does not allow for elasticity, meaning that a single machine failure would cause the failure of the entire ML program, or could recover from machine failure by compromising the overall performance, sometimes 10 times slower than the non-elastic systems. The performance of the inventive solution is not only equivalent to the current state-of-the-art non-elastic systems for distributed ML programs, but also able to recover within a few seconds from machine failures while an ML program is running, and proceed with the remaining available machines.

Furthermore, a unique benefit of the inventive solution is that it can integrate additional physical computation devices (e.g., physical machines, CPU cores, etc.) in the distributed computing system, and attach them to a running ML program for additional speed up, all within a few seconds. This could happen, for example, when another program running on the distributed computing system has completed and the machines are released.

In various embodiments, the inventive solution is embodied in a system implementing a method for elastic resource management of ML program execution in a distributed computing environment. In various embodiments, the system includes the one or more of the following exemplary modules: an input data partitioning (IDP) module, a set of logical executors (LEs), a parameter server (PS) module, a set of logical servers (LSes), an application programming interface (API) module, and a driver (D) module.

These modules coordinate the execution of an ML program over a set of physical computing units in the distributed computing system (DCS), in an efficient divide-and-conquer fashion. In various embodiments, each physical computing unit is an autonomous computing device (e.g., server, a datacenter machine, or a CPU core of a server or datacenter machine) that can interact with each other to accomplish a common computation task by passing messages among each other. In various embodiments, each physical computing unit can include multiple CPU cores. In various embodiments, an input data is used by the system with the ML program to train a useful computation model by gradually learning the model parameters through an iterative process.

Input Data & Update Calculations Partitioning: In various embodiments, the input data partitioning (IDP) module partitions and divides the input data and updates calculations (or Work Tasks) of the ML program into small sub-units, termed input data sub-units and micro-tasks, respectively, and distribute them across any number of physical computing units of the distributed computing system. In various embodiments, the number of partitions does not need to be equal to the number of physical computing units. In various embodiments, the number of partitions is many times the number of the physical computing units. In various embodiments, each partitioned updates calculation is a short computation unit that lasts for less than one second.

Logical Executors: In various embodiments, the partitioned input data (or input data sub-units) and updates calculations ("micro-tasks", or "tasks" for short) are assigned to a set of logical executors (LEs), which are responsible for executing the ML program in a divide-and-conquer fashion using multiple physical computing units, with each micro-task generating a partial update to the ML program's state (or model parameter values).

In various embodiments, each LE is mapped to a physical computing unit of the distributed computing system. This separation enables elasticity in computation resource management by allowing more LEs to be created than the number of physical computing units, where each LE (each LE's state and input data) can be migrated from one physical computing unit to another as it become available.

During execution, each micro-task is granted read/update access to the PS module, via a key-value database API method, and applies partial updates to ML program's model parameters by modifying ML program-defined state in the LE and/or updating globally-shared values in the PS module Every LE maintains a work queue of tasks from the ML program. When a task has been received by the work thread, it is pushed onto (e.g., the front of) the work queue. The task at the front of the queue is executed until completion.

The LEs employ co-operative multitasking: when one task is waiting on the PS module's response for model parameters request, it will switch to another task, so that useful work can still be performed. Each task is executed within a separate co-routine, which is associated with its own stack. Switching between tasks is done by first yielding control back to the driver module existing in the main work thread loop, which can then jump to another task.

The LEs coalesce its calculation updates to reduce network usage. Each LE contains an update cache, and whenever a micro-task updates a table value (model parameter value), the given update is coalesced into an existing update in the update cache, or inserted if there is no existing update. Therefore, an update in the update cache can be a combination of updates generated by multiple micro-tasks. When a micro-task completes, its updates are buffered in the update cache for some time before being flushed. The rate of flushing the update cache is controlled by a user-defined tuning parameter.

Application Programming Interface (API) Module: In various embodiments, the API module serves as an interface between the ML program and the software framework of the inventive system, and/or as an interface among various components (e.g., modules) of the framework. In various embodiments, it includes one or more libraries of functions, routines, sub-routines, and/or databases that can be invoked by the ML program and/or various components of the inventive system. In various embodiments, these functions, routines, sub-routines, and/or databases are useful for the development and/or execution of the ML program and help to reduce the work overhead for programming the ML program. The API module is also useful for bridging the programming language gap between the ML program and the inventive system. In various embodiments, the API module is configured to allow the system to communicate with and execute ML programs programmed in different programming languages.

In various embodiments, the system's API module allows the ML program to have advanced optimization such as model scheduling and bounded staleness. The API allows the ML program to specify dependencies between micro-tasks, and dynamically dispatch micro-tasks whenever the ML program specified dependencies are satisfied at run-time with the following system guarantees: if micro-task A is a dependency for micro-task B, then (1) A is executed before B is executed, and (2) B sees all changes to executor and parameter server state made by A. This strict ordering and consistency guarantee lets the ML program perform model scheduling by defining an order for which certain updates are calculated and applied. On the other hand, if neither A nor B is a dependency of for the other, then they may be executed in any order or in parallel, and may see none some, or all of the updates made by the other. This non-determinism lets the system exploit the error-tolerance property of ML programs by allowing the system's run-time system to cache or use stale model parameter values from the parameter server module between dependent or independent micro-tasks, thus micro-task A can use cached updates of micro-task B, provided the staleness of the updates values are within a certain limit or bound.

Parameter Server Module: PS module allows the ML program to have a distributed shared memory, which allows the ML program state to become global and accessed from any physical computing unit, via a key-value database API method. The PS module creates a set of logical servers (LSes), which are in turn mapped to physical memory on each physical computing unit. This separation enables elasticity by allowing LSes to be migrated to physical memory as it becomes available. The PS module statically hash-partitions the parameter values, based on their key, into the LSes.

The benefit of the PS module is to abstract consistency management and networking operations away from the ML program, and present a key-value database interface. A Get ( ) function (e.g., PSGet (key) API method) is used to read parameters, and an Inc ( ) function (e.g., PSUpdate (key, update) API method) is used to increment the parameter by some delta. In order to exploit locality in the ML program and thus amortize the overhead of operating on concurrent data structures and network messaging, the ML programmer will partition the model state (or model parameters) across keys, each key corresponds a set of model parameter values that are usually accessed together. These key-value pairs are the smallest unit of communication between LEs and LSes.

When an LS is transferred from one physical computing unit to another, a LE may request for a key-value pair from the original physical computing unit, which no longer holds the key-value pair. This is addressed by having each LS perform request forwarding: when an LS receives a request for a key-value pair it no longer holds, it forwards the request to the physical computing unit in the distributed computing system with the relevant LS (e.g., the last LS to which it has forwarded the key-value pair).

In order to eliminate redundant network usage, each LS in the PS module is able to cache previously fetched values (e.g., fetched from other LSes) locally, and serve values from the local cache instead.

The PS module uses the following cache coherence protocol: (1) If the ML program dispatches task B before being informed of the completion of task A, the PS module assumes that task B does not depend on any updates made by task A. In this case, task B may see none, some, or all of the updates from A. (2) If the ML program dispatches task B after being informed of the completion of task A, the PS module assumes that task B depends on all updates made by task A. In this case, task B will see all updates made by task A.

Bulk Synchronous Parallel & Bulk Asynchronous Parallel: This cache coherence protocol allows the PS module to support two standards of executing ML programs: (1) Bulk Synchronous Parallel (BSP): The BSP execution standard ensures correct ML program execution; it requires all updates computed by previous tasks to be made visible before the current task starts. This is achieved by ensuring that a task B that depends on task A is never dispatched before A completes. (2) Bounded Asynchronous Parallel (BAP): The BAP execution standard enables the majority of ML program operations to execute faster on datacenters, without compromising ML program correctness; it allows the current task to proceed without visibility of all updates computed by previous tasks (or tasks it is a dependency of). This is achieved by allowing a task B that depends on task A to be dispatched before A completes.

BAP is advantageous for ML programs running on a distributed computing system such as a datacenter or cloud, because it allows them to finish execution substantially faster. This is because: (1) BAP negates slowdowns due to stragglers (or slow jobs that impedes job completion), which are individual physical computing units that are running momentarily slower for reasons such as uneven computational and networking load, or distributed computing system environmental factors such as heat and vibration; (2) BAP allows for more update batching or coalesce, thus reducing the network bandwidth required by an ML program. Network bandwidth is always a bottleneck factor in distributed ML program execution, being hundreds to thousands of times slower than CPU computation. BAP is workable for distributed ML computation because of the relaxed synchronization requirement of ML computation as discussed before, BAP standard can be employed if the staleness of the model parameter values is within a certain limit or bound. In various embodiments, this limit or bound can be user defined.

At the same time, BSP is needed for certain ML program operations that require precise synchronization, one example being proximal or projection operations in optimization-based ML programs. BSP also allows the system to support more classes of programs beyond ML programs, such as Map-Reduce programs and database programs.

Driver Module: The driver (D) module coordinates the execution of the ML program in two ways: (1) the D module runs a task dispatcher that receives Work Tasks (WTs) from ML programs, and sends them to LEs as micro-tasks to be completed; (2) the D module maintains the dynamic mappings between micro-tasks and LEs and between LEs and physical computing units; (3) the D module maintains the dynamic mappings between key-value pairs and LS inside the PS module and between LSes and physical computing units. When LEs or LSes are created or destroyed, the D module initiates load re-distribution by sending requests to transfer partitioned WTs (micro-tasks) between LEs, or key-value pairs containing keys and corresponding model parameters between LSes. The D module periodically triggers a checkpoint to be taken of the entire ML program state, and automatically restores it upon any failure.

Elastic Resource Management: During an elasticity event, defined as the addition (or removal) of physical computing units to the ML program, the Work Tasks must be re-balanced. The D module achieves this by moving micro-tasks, input data and internal state of some LEs from over-loaded physical computing units to under-loaded physical computing units. After transferring the micro-tasks, input and state of an LE, the computation can continue on the transferred-to physical computing unit.

The load of a physical computing unit is determined by the number of LEs assigned to it. In order to achieve more balanced load for various numbers of physical computing units, the D module launches an ML program with a large number of LEs (by creating a large number of LEs), partitioning the ML program's state and WTs into a large number of parallel units, and assign them to individual LEs created.

In various embodiments, when an LE needs to be moved or migrated, the D module first waits until the LE has finished processing its current task, then initiates a transfer of its internal state. The LE is prevented from taking on further computational tasks until the transfer is completed.

In various embodiments, to prevent LE transfer or migration from holding up other computational tasks, the D module employs a bounded staleness mode of execution (e.g., for the remaining LEs). Each LE may have several tasks queued up, and the LE is allowed to work ahead on any of these tasks without waiting for tasks on other LEs to finish. The D module prioritizes transfer of LEs that have the fewest outstanding tasks to be completed.

In various embodiments, when a new physical computing unit joins the ML program computation, (1) new LEs and LSs are created on the new physical computing unit and tracked by the D module and the PS module respectively, (2) micro-tasks are selected from existing LEs in the system, and the D module suspends their execution, (3) the selected micro-tasks and their internal state and data are moved to the new LE, so as to maintain the same number of micro-tasks on each LE, (4) key-value pairs are selected from existing LSes in the system, and moved to the new LSes, the selected existing LSes set up request forwarding for the moved key-value pairs, (5) the D module restarts the suspended micro-tasks.

In various embodiments, when an existing physical computing unit leaves the ML program computation, (1) the D module suspends execution of micro-tasks from the leaving physical computing unit's LEs, (2) the suspended micro-tasks and their internal state are moved to the remaining LEs on other physical computing units of the system, so as to maintain the same number of micro-tasks on each LE, data on the leaving physical computing unit is not transferred, but is instead re-loaded at the destination LEs, (3) key-value pairs from the leaving physical computing unit's LSes are moved to the remaining LSes on other physical computing units, (4) the D module stops tracking the leaving physical computing unit's LEs, and the PS module stops tracking the leaving physical computing unit's LSes, and (5) the D module restarts the suspended micro-tasks.

In various embodiments, when the system needs to create a recovery checkpoint, the D module will suspend execution of the ML program by waiting for all the LEs to finish their current tasks, and pauses all queued tasks from each LE. The D module takes a checkpoint consisting of: (1) a copy of the D module's state, (2) copies of the task queue for each LE; (3) serialized copies of each LE's internal state; (4) serialized copies of each LSes key-value pairs.

Failures in the system are detected using a heartbeat mechanism. Each physical computing unit sends periodic heartbeat messages to the D module, which keeps track of all physical computing unit. A physical computing unit is assumed to have failed if a heartbeat message has not been received for an extended amount of time. The D module then initiates the recovery process, by restoring from the checkpoint.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Applicants' Motivation and Rationale for the
Present Invention

ML algorithms come in many forms (e.g. matrix factorization, topic models, factorization machines, deep neural networks), nearly all of them share the following commonalities: (1) they possess a loss or object function L(A, D), defined over a vector (or matrix) of model parameters A and a collection of input data D, and which measures how well the model parameters A fit the data D; (2) their goal is to find a value of A that maximizes (or alternatively, minimizes) the objective L(A, D), via an iterative-convergent procedure that repeatedly executes a set of update equations, which gradually move A towards an optimal value (i.e., hill-climbing). These update equations follow the generic form $$A^{(t)}=A^{(t-1)}+\Delta(A^{(t-1)},D) \qquad (1)$$

where $A^{(t)}$ is the vector (or matrix) of model parameters at iteration t, and $\Delta(\ )$ is a function that computes updates to A using the previous value $A^{(t-1)}$ and the input data D. Below we provide detailed background on specific properties of the ML algorithms, on which our inventive system and method exploit to improve efficient elastic resource management of ML software applications.

Data-parallelism and Parameter Server

Arising from the iid (independent and identically distributed) assumption on input data, the update function $\Delta$ can often be decomposed as $$\Delta(A,D)=\sum_{i=1}^{P}\Delta_i(A_i,D_i) \qquad (2)$$

where $D_1, \ldots, D_P$ partition the input data D and each $\Delta_i$ computes a partial update using $D_i$ which, when aggregated, form the final update $\Delta$. This allows each update to be calculated in a data-parallel fashion with input data and update calculations distributed across a cluster of workers.

Parameter Server: Eq. 2 shows that the model parameter A are used by the calculations of every partial update $\Delta_i$. In a data-parallel setting it is natural to place the model parameters in a shared location accessible by every computation machine, known as a parameter server. Typically, implementations of this architecture consist of two types of computation nodes: (1) worker nodes which partition the input data and calculate partial updates and (2) parameter server nodes which partition the model parameters and aggregate/apply the partial updates sent by worker nodes. This parameter server architecture is an important component in efficient distributed ML.

The parameter server architecture plays an important role in exposing the inherent dynamic resource usage of ML programs. Specifically, as explained in more detail later, model parameters can become sparse (i.e. mostly zeros) as run-time increases, resulting in decreasing memory usage when using a sparse in-memory representation. By separating the placement of model parameters from input data, one isolates the portion of the application state that exhibits this behavior and is able to adjust its resource allocation in a fine-grained manner.

Stateful Workers: Even though the model term A appears in the calculations of each partial update, not all of it is necessarily used. In particular, there may be parts of the model which are only used when processing a single partition $D_i$ of the input data. a large class of examples include non-parametric models, whose model structures are not fixed but instead depends on the input data itself, typically resulting in model parameters being associated with each entry in the input data. In such applications, it is preferable to co-locate parts of the model on worker nodes with a particular partition of input so that they can be accessed and updated locally rather than across a network. This optimization is especially essential when the input data is large and accesses to such associated model parameters far out number accesses to shared model parameters. It also means that workers are stateful and an elastic ML system that supports this optimization needs to preserve worker state during elastic resource adjustments.

(b). Error Tolerance and Relaxed Consistency

ML algorithms have several well-established and unique properties, including error-tolerance: even if a perturbation or noise $\epsilon$ is added to the model parameters in every iteration, i.e. $A^{(t)}=A^{(t-1)}+\Delta(A^{(t-1)}, D)+\epsilon$, the ML algorithm will still converge correctly provided that $\epsilon$ is limited or bounded.

Bounded Staleness Consistency: An important application of error tolerance is bounded staleness consistency models, which allow stale model parameters to be used in updated computations, $A^{(t)}=A^{(t-1)}+\Delta(A^{(t-1)},D)$, where $1 \le s \le k$ for small value of k. ML algorithms that use such consistency models are able to (1) execute in a partially asynchronous manner without sacrificing correctness, thus mitigating the effect of stragglers or slower workers; and (2) reduce the effect of network bottlenecks caused by synchronization by allowing cached parameter values to be used.

Staleness-Aware ML Algorithms: Beyond applying bounded staleness consistency to existing algorithms, the ML community has developed new staleness-aware algorithms which modify each update $\Delta(\ )$ according to the staleness s that it experiences. The modifications usually take the form of a scaling factor $\Delta(\ ) \leftarrow c\Delta(\ )$, which are computationally light-weight and do not create new bottlenecks. In the presence of staleness, these algorithms converge up to an order of magnitude faster than their non-staleness-aware counterparts.

Example ML Framework: Bösen is a recent framework that relaxes the consistency of access to shared parameter stored on a parameter server to achieve higher throughput and faster convergence for error-tolerant and staleness-aware ML algorithms. It implements the Stale Synchronous Parallel (SSP consistency model in which the distributed computation proceeds in a series of iterations, and stale parameter values may be used for up to a constant number of iterations that pass. Although Bösen successfully supports relaxed consistency, it restricts applications to the SSP mode of execution, limiting its support for model scheduling and the important class of dependency-aware algorithms.

(c). Dependency Structures and Model Scheduling

Another key property of ML algorithms is the presence of implicit dependency structures: supposing $A_1$ and $A_2$ are different elements of A, then updating $A_1$ before $A_2$ does not necessarily yield the same result as updating $A_2$ before $A_1$; whether this happens or not depends on the algebraic form of $L(\ )$ and $\Delta(\ )$. As a consequence, the convergence rate and thus the running time of ML algorithms can be greatly improved through careful scheduling of parallel model parameter updates.

Dependency-Aware ML Algorithms: Like the many existing staleness-aware algorithms that exploit error tolerance, there is a rich set of algorithms that use dependency structures in their models to perform better scheduling of updates. A typical example is to partition the model into subsets, where the parameters inside a subset must be updated sequentially, but multiple subsets can be updated in parallel. Two parameters $A_1$ and $A_2$ are placed into the same subset if the strength of their dependency exceeds a threshold $dep(A_1, A_2) > \epsilon$. As with staleness-aware algorithms, dependency-aware algorithms converge up to an order of magnitude faster than their non-dependency-aware counter parts.

Example ML Framework (STRADS): STRADS is a recent framework that provides an interferface and system architecture for model scheduling, enabling the implementation of dependency-aware algorithms. A STRADS application repeats the following until convergence: (1) partition the parameters into subsets obeying the aforementioned rules, (2) calculate partial updates in parallel according to the partitioning, and (3) collect the partial updates and apply them to the parameters. Although STRADS introduces staleness in a limited way via pipelining, it does not handle asynchronous updates to parameters, limiting its support for staleness-aware algorithms like AdaptiveRevision which are designed to execute fully asynchronously.

(d). Dynamic Resource Usage

The iterative-convergent nature of ML algorithms along with aforementioned properties present opportunities for resource allocation not usually found in other computing tasks and open up new opportunities for multi-tenancy among concurrent ML jobs. In particular, ML programs may consume less resources as they converge to an optimal value of the model parameters A, which suggests that computing resources may be relinquished from long-running ML jobs to be spent elsewhere for better utility. We present several examples of such run-time dependent resource variability, and leave the leveraging of this phenomenon for efficient scheduling in multi-user clusters for future work.

Sparsity of Model Parameters: Certain ML algorithms may find their model parameters becoming sparse (mostly zeros) as they approach convergence, permitting the application to use a more memory-efficient storage format (e.g. sparse vs. dense matrix) to reduce memory consumption—thus freeing up memory for new ML programs. For example, the memory usage of a popular ML program—Latent Dirichlet Allocation—running on a 12 node cluster. It starts with over 390 GiB of aggregate RAMand drops by 23% to about 300 GiB within 10 epochs (passes over the input data), freeing about 90 GiB that can be allocated to another job.

Non-Uniform Convergence: Furthermore, model parameters may converge to their optimal values non-uniformly. For example, GraphLab showed that majority of the parameters converge in a single update in their PageRank experiments; likewise, STRADS reported that over 90% of the parameters converge after ≤5 iterations in their Lasso experiments. Current ML frameworks make use of this property to re-prioritize a fixed amount of CPU cycles onto slower-converging parameters. Yet, looking at it another way, non-uniform convergence suggests new opportunities for CPU elasticity; since computation for updating already-converged parameters can be executed less frequently (or not at all), the saved CPU cycles may be allocated to another job.

Bounded Staleness Execution: A third opportunity comes from bounded staleness consistency models, which allows ML programs to trade off network usage for convergence speed via a tunable staleness parameter—in particular, it has been shown that the trade off between network usage and convergence speed is non-linear and subject to diminishing returns. This second point is important for the multi-tenant setting because it implies that network allocation between different ML jobs is not a zero-sum game; rather, it is possible to intelligently allocate bandwidth to each ML job using a strategy that jointly optimizes the completion times for multiple jobs at once.

(e). Example: Multinominal Logistic Regression (MLR)

Multinomial Logistic Regression (MLR) is a multi-label classifier that is effective for large-scale classification, and image classification. Given training data samples with D-dimensional feature vectors $x^{(1)}, \ldots x^{(N)}$ with corresponding labels $y^{(1)}, \ldots y^{(N)}$ belonging to K classes, MLR learns KD-dimensional weight vectors $w^{(1)}, \ldots w^{(N)}$ so that the predicted probability that an unlabeled data sample x belongs to class k is proportional to $\exp(w^{(k)} \cdot x)$.

In the distributed setting, MLR is commonly trained by minimizing its cross-entropy loss function using a data-parallel stochastic gradient descent (SGD) algorithm, which is error-tolerant and theoretically proven to remain correct under bounded staleness. Therefore, the MLR application using SGD is a natural fit for a framework like Bösen, which employs the SSP consistency model to increase throughput while ensuring correctness. Each worker stores a subset of input data, and at each iteration processes a minibatch from the subset, computes a gradient, and updates the model parameters in the parameter server.

(f). Example: Latent Dirichlet Allocation (LDA)

Latent Dirichlet Allocation (LDA) is a widely-used Bayesian probabilistic model for topic modeling (clustering documents into different topics) that is commonly trained using the popular Gibbs sampling algorithm. Assuming there are D documents, K topics, V distinct words across all documents, and letting $w_{di}$ denote the i-th word in document d, three sets of parameters are trained: (1) U, a D×K "document-topic" matrix in which $U_{dk}$ counts the number of words in document d that are assigned to topic k, (2)W, a V×K "word-topic" matrix in which $W_{vk}$ counts the number of times word v is assigned to topic k across all documents, and lastly (3) $z_{di}$, the topic assigned to each $w_{di}$. The algorithm repeatedly sweeps over all $z_{di}$, assigning each a new value randomly sampled from a distribution computed using the d-th row of U and the $w_{di}$-th row of W. The matrices U and W are updated to reflect this change after each new value is assigned.

In the distributed setting, processing each $z_{di}$ is typically performed in parallel, but if done naively can hurt convergence due to the dependency structures inherent in the LDA model. In particular, processing $z_{d_1 i_1}$ and $z_{d_2 i_2}$ in parallel will concurrently modify the same row of U if $d_1 = d_2$, or the same row of W if $i_1 = i_2$. Therefore, LDA is a natural fit for a framework like STRADS, which employs a block-partitioned schedule that eliminates such write conflicts. The rows of W are divided into P blocks, each assigned to a different worker. Each worker sequentially processes the $z_{di}$ corresponding to its local documents and currently assigned block of W. The block assignments are rotated P times so that each worker updates all of W.

Additionally, each row of U and z correspond to a particular document in the input data, and is only accessed when processing that document. They are examples of parameters which are best co-located with the input data, especially considering that z has the same size as the input data, and can be prohibitively expensive to retrieve over the network during each iteration. Therefore, LDA is an example of an application that requires stateful workers to achieve efficient distributed execution.

BRIEF DESCRIPTION OF THE DRAWINGS

The Detailed Description is described in reference to the accompanying figures:

FIG. 8 is schematic diagram illustrating a bulk asynchronous parallel execution standard according to various embodiments, where dependent micro-tasks can be executed in parallel without waiting for updates from micro-tasks they depend on.

DETAILED DESCRIPTION

The present invention can be implemented in numerous ways, including as a method; a process; an apparatus; a system; a device (external and/or implantable); a software; a software platform; a software framework; and/or a software as a service (SAAS). A detailed description of one or more embodiments of the invention is provided below along with accompanying figures that illustrate the principles of the invention. The invention is described in connection with such embodiments, but the invention is not limited to any embodiment. In general, the order of the steps of disclosed processes may be altered, one or more steps of disclosed processes may be omitted within the scope of the invention, and one or more steps may be added to the disclosed processes.

According to one aspect, an inventive solution is provided for elastic resource management for executing ML programs in distributed computing systems. In various embodiments, ML programs are artificial intelligence algorithms that enable computer system to "learn" or progressively build and improve performance of computer models on specific computation tasks with input data, without being explicitly programmed to do so, either in a supervised or unsupervised fashion. A distributed computing system is a computing system in which computing devices in the system are networked computing devices that coordinate their actions by passing messages.

Figure 1:
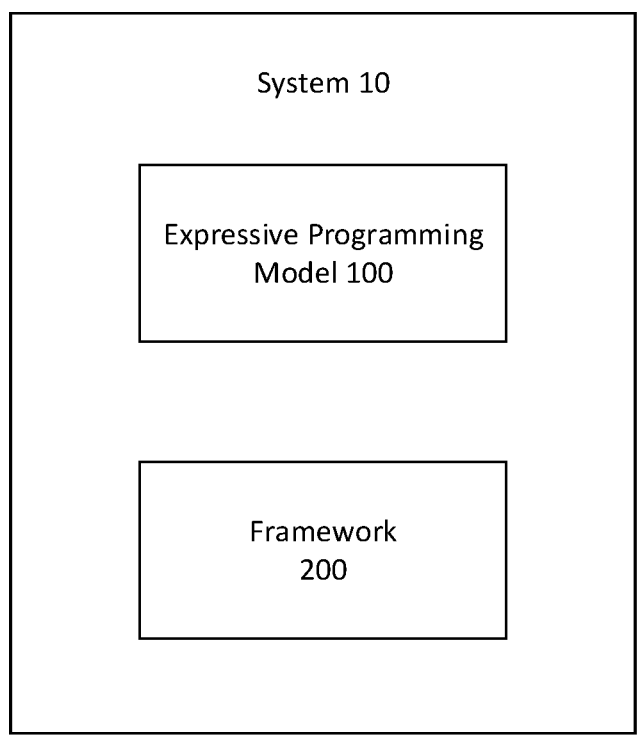
FIG. 1 is a schematic diagram illustrating a system for elastic resource management in distributed machine learning computing according to various embodiments.

Expressive Programming Model & Software Framework: In various embodiments, as shown in FIG. 1, the inventive solution comprises a system 10 implementing a method or process for elastic resource management of ML program execution in a distributed computing system. The system 10 (1) provides an expressive programming model 100 for programming ML programs that support stateful logical workers and are both staleness-aware and dependency-aware, and (2) software framework 200 for executing the ML programs built with the aforementioned-programming model 100 in a distributed computing environment in an elastic fashion, allowing the system to scale in or out according to changing resource demand with low overhead. In various embodiments, the expressive programming model 100 aims to strike a balance between being expressive enough to support a wide variety of proven algorithmic techniques in distributed ML programs, while exposing enough structure in the ML programs that the underlying execution system can optimize.

Figure 2:
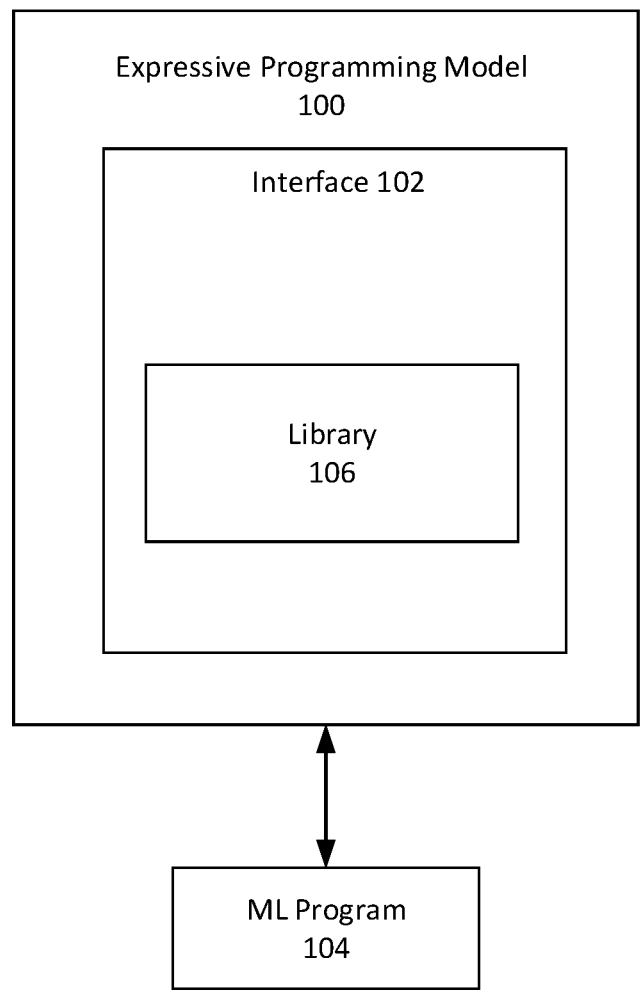
FIG. 2 is schematic diagram illustrating an expressive programming model of the system of FIG. 1 according to various embodiments.

In various embodiments, as shown in FIG. 2, the expressive programming model 100 comprises a programming interface 102 that facilitates a programmer to develop, program, and/or modify, ML programs 104 that allows the ML programs 104 to support stateful workers (e.g., logical executors) as well as being both staleness-aware and dependency-aware. In various embodiments, the programming interface 102 includes one or more libraries 106 of databases, functions, routines, and/or sub-routines which a programmer can invoke through the programming interface 102 for programming the ML programs 104. In various embodiments, the programming interface 102 is a part of the application programming interface module 212 (FIG. 3) of the system 10.

Figure 3:
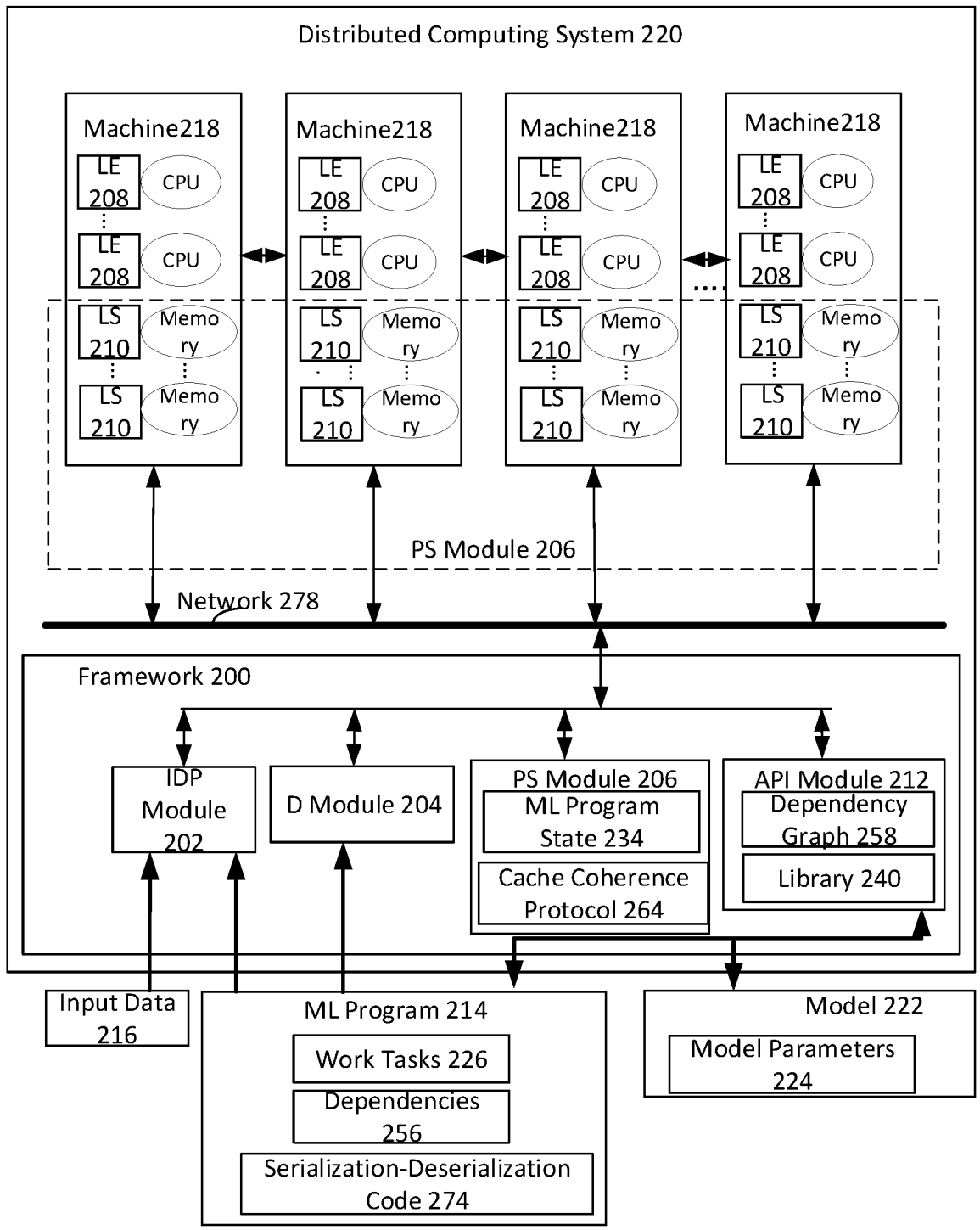
FIG. 3 is a schematic diagram illustrating a framework of the system of FIG. 1 according to various embodiments.

Exemplary System Modules: In various embodiments, as shown in FIG. 3, the framework 200 is a software framework that comprises an input data partitioning (IDP) module 202, driver (D) module 204, a global parameter server (PS) module 206, a set of logical executors (LEs) 208, a set of logical servers (LSes) 210, and an application programming interface (API) module 212. In various embodiments, these modules coordinate the execution of ML programs 214 with input data 216 over a set of physical computing units 218 in a distributed computing system 220. In various embodiments, the output of the execution of the ML program 214 on the framework 200 is a computer model 222 with a final set of model parameters 224 of the computation.

In various embodiments, each physical computing unit 218 is an autonomous computing unit such as a server or a datacenter machine. In various embodiments, each physical computing unit 218 can have multiple CPU cores. In various embodiments, each physical computing unit is a physical CPU core on a server or a computing machine. In various embodiments, the set of physical computing units 218 are networked autonomous computing devices that coordinate with each other by passing messages amongst themselves to achieve a common computation goal.

Figure 4:
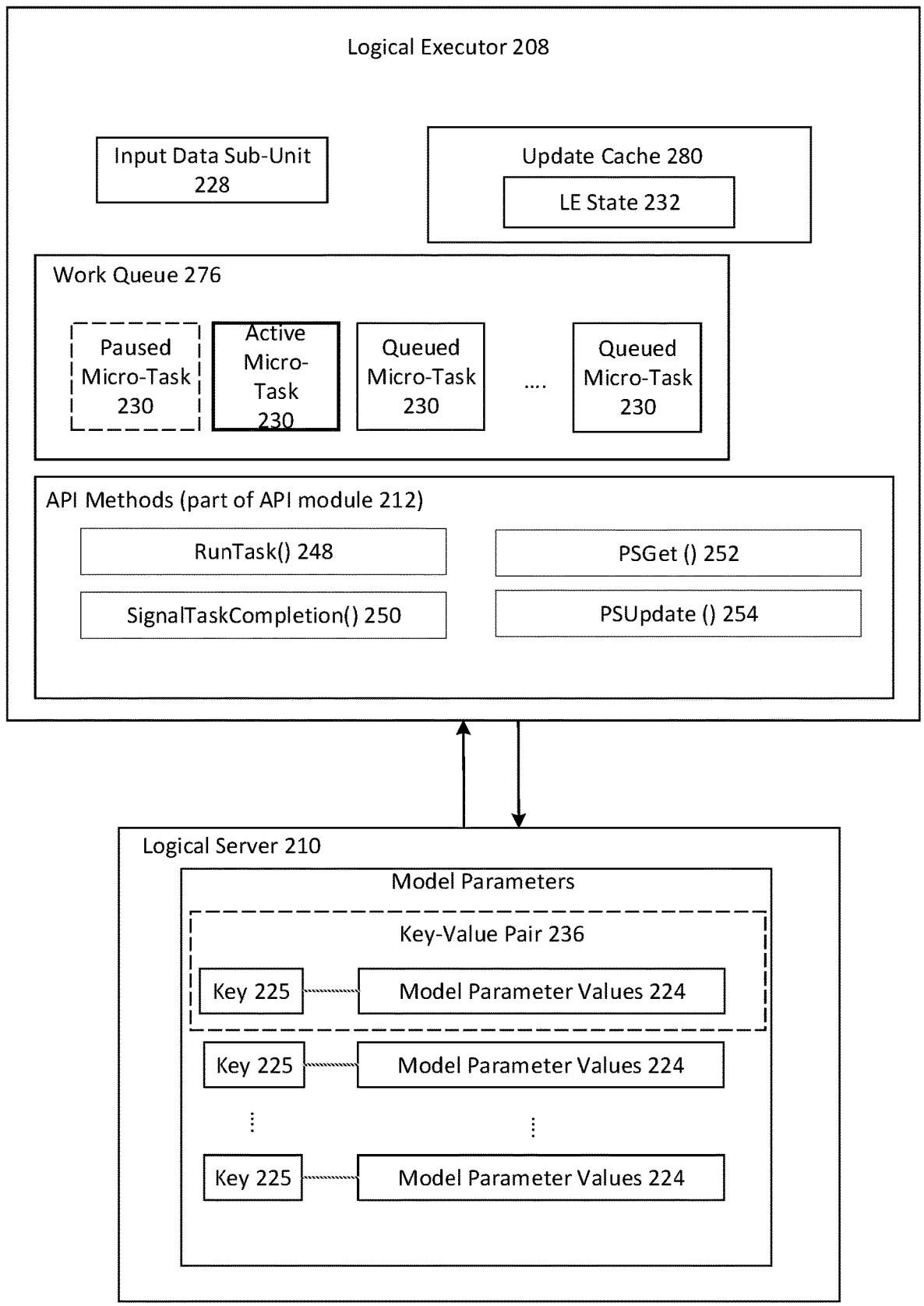
FIG. 4 is a schematic diagram illustrating a logical executor and a logical server of the system of FIG. 1 according to various embodiments.
Figure 5:
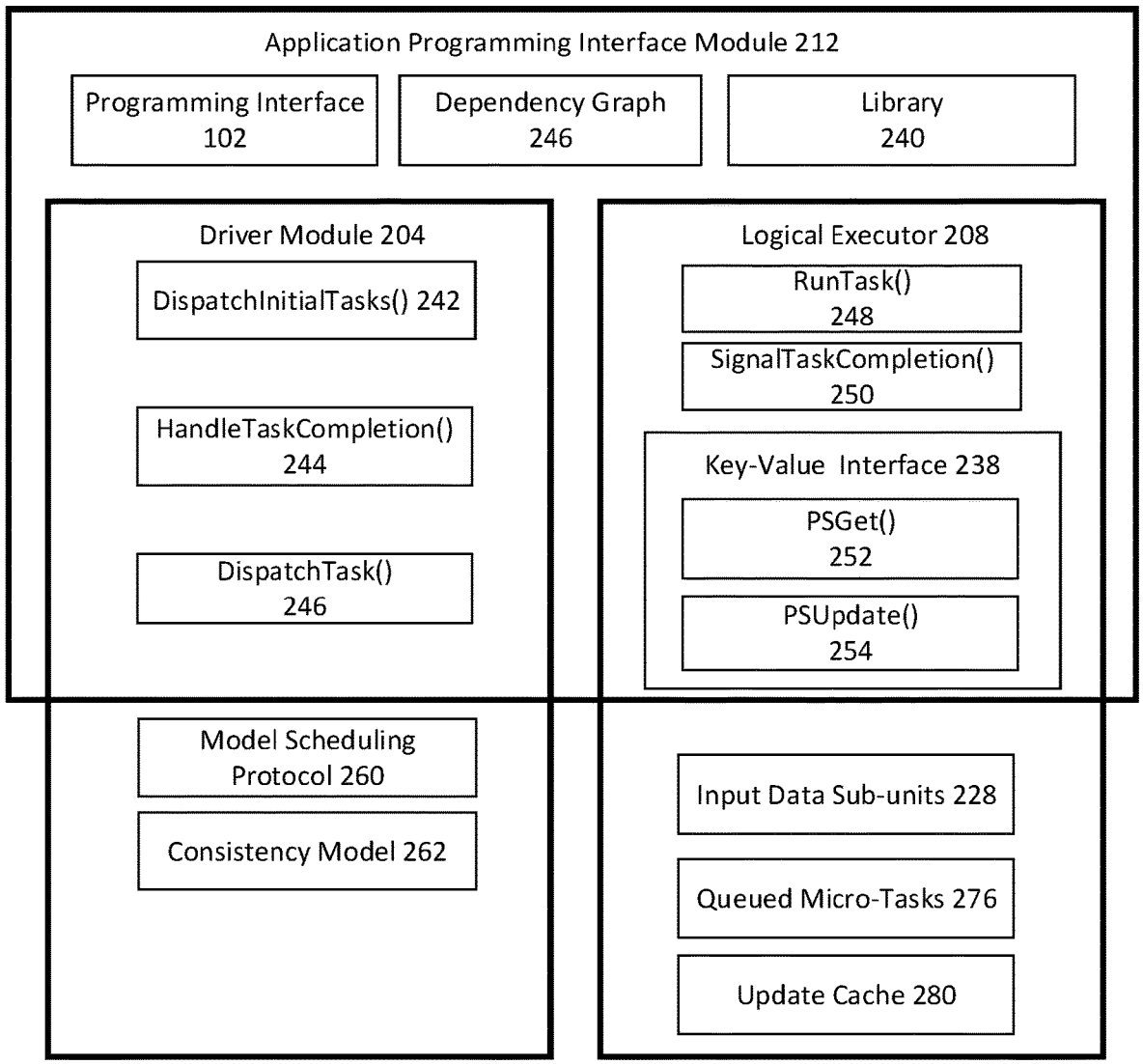
FIG. 5 is a schematic diagram illustrating an application programming interface of the system of FIG. 1 according to various embodiments.

Input Data and Updates Calculations Partition: In various embodiments, as shown in FIGS. 3 & 4, the input data partitioning (IDP) module 202 partitions the input data 216 and updates calculations (or Work Tasks) 226 of ML programs 214 into small input data sub-units 228 and small update calculation tasks (micro-tasks) 230, respectively, and distribute them across a set of physical computing units 218 in the distributed computing system 220 according to availability and computation load. In various embodiments, the input data 216 and update calculations 226 partition can be carried out according to Eq. 2 (discussed previously). The number of partitions is not specified by Eq. 2 and in various embodiments can be defined or adjusted by a programmer according to the needs of the ML program 214. In general, the number of partitions does not need to be equal to the number of physical computing units 218. In various embodiments, it is preferable to have the number of partitions to be many times (e.g., 10×, 100×, 1000×, 10,000×) of the number of physical computing units 218 to increase resource management flexibility. In various embodiments, a programmer can specify the granularity or degree of the partitioning.

In various embodiments, instead of making input data 216 and update calculations (or Work Tasks) 226 assignment directly to physical computing units 218, the system 10 first distribute them across a set of LEs 208. In various embodiments, the driver module 204 creates the set of LEs 208 and assigns the input data sub-units 228 and micro-tasks 230 across the set of LEs 208, which are responsible for executing the ML program 214 in a divide-and-conquer fashion using one or more physical computing units 218. In various embodiments, each LE 208 is then mapped by the driver module 204 to a physical computing unit 218.

This scheme of partitioning and distributing input data 216 and updates calculation 226 of ML programs 214 enables elasticity by allocating more LEs 208 than physical computing units 218, and allows migration of LE's micro-tasks 230, state 232 and partitioned input data sub-units 228 to other physical computing units 218 as they become available. In various embodiments, the system 10 support stateful LEs by allowing the LE's state 232 to be defined by the ML program 214, for example by allowing it to be defined by the micro-tasks 208 assigned to the LE 208, and treated as a black box by the run-time system 300 (FIG. 6) of the system 10.

In various embodiments, the micro-tasks 230 are short-lived (typically shorter than 1 second) units of computation, each calculates a partial update to the ML program's state (comprising a set of ML model parameters) 234. In various embodiments, during this execution, a micro-task 230 is granted read/update access to the model parameters stored in the global parameter server (PS) module 206, via a key-value database interface 238 (e.g., PSGet and PSUpdate API methods), and applies partial updates to the ML program's state 234 by modifying the ML program 214 defined state in the LE (or LE state 232) and/or updating the ML program's state 234 stored in the global parameter server (PS) module 206. In various embodiments, the ML program's state 234 correspond to the current values of the model parameters 224 stored in the parameter server module 206.

Logical Executors: In various embodiments, each LE 208 maintains a work queue of tasks 276 from the ML program 214. In various embodiments, when a micro-task 230 has been received by the LE 208 existing in the work thread loop 304 (FIG. 6), it is pushed onto (e.g., the front of) the work queue 276. The micro-task 230 at the front of the queue 276 is executed until completion.

In various embodiments, the LEs 208 employ co-operative multitasking: when one task 230 is waiting on the PS module's 206 response for model parameters request, it will switch to another micro-task 230, so that useful work can still be performed. Each micro-task 230 is executed within a separate co-routine, which is associated with its own stack. Switching between micro-tasks 230 is done by first yielding control back to the driver module 204 existing in the master thread loop 302, which can then jump to another micro-task 230.

The LEs 208 coalesce its calculation updates to reduce network usage. Each LE 208 contains an update cache 280, and whenever a micro-task 230 updates a table value (or a model parameter value), the given update is coalesced into an existing update in the update cache, or inserted if there is no existing update. Therefore, an update in the update cache 280 can be a combination of updates generated by multiple micro-tasks 230. When a micro-task 230 completes, its updates are buffered in the update cache 280 for some time before being flushed. The rate of flushing the update cache 280 is controlled by a user-defined tuning parameter.

API Module: In various embodiments, the API module 212 serves as an interface between the ML programs 214 and the framework 200, and/or between various modules of the framework 200. In various embodiments, it includes the programming interface 102 for programming or modifying ML programs. In various embodiments, it includes a library 240 of databases, functions and/or routines that can be invoked by the system 10 via the API module 212. In various embodiments, the library 240 is useful for the development and/or execution of the ML programs 214 and helps to reduce the overhead for developing ML programs 214. In various embodiments, the API module 212 is useful for bridging the programming language gap between the ML programs 214 and the system 10. In various embodiments, the API module 212 is configured to allow the framework 200 to communicate with and/or execute ML programs 214 programmed in different programming languages.

In various embodiments, as shown in the following table, the API module 212 includes the following API methods (or calls to functions or routines stored in the library 340 associated with the API module 212): (1) DispatchInitialTasks( ) 242, (2) HandleTaskCompletion(result) 244, (3) DispatchTask (executor, args) 246, (4) RunTask (args) 248, (5) SignalTaskCompletion (result) 250, (6) PSGet(key) 252, and (7) PSUpdate (key, update) 254. In various embodiments, ML programs 214 define DispatchInitialTasks( ) 242 and HandleTaskCompletion(result) 244 on the driver module 204 and RunTask (args) 248 on the logical executors 208, while the system's 10 framework 200 defines DispatchTask (executor, args) 246 on the driver module 204, and defines SignalTaskCompletion (result) 250, PSGet(key) 252 and PSUpdate (key, update) 254 on the logical executors 208.

| API Method Name | Part Of | Defined By | Description |
| --- | --- | --- | --- |
| DispatchInitialTasks( ) | Driver Module | ML Program | Invoked by the framework upon start-up to dispatch first set of micro-tasks |
| HandleTaskCompletion (result) | Driver Module | ML Program | Invoked by the framework when a micro-task completes so that the Driver module can dispatch a new set of micro-tasks |

| API Method Name | Part Of | Defined By | Description |
| --- | --- | --- | --- |
| DispatchTask (executor, args) | Driver Module | System | Invoked by the ML program to dispatch a micro-task to a specific Logical Executor |
| RunTask (args) | Logical Executor | ML Program | Invoked by the framework to perform a micro-task on the Logical Executor |
| SignalTaskCompletion (result) | Logical Executor | System | Invoked by the ML program to indicate the completion of a micro-task |
| PSGet (key) | Logical Executor | System | Returns a specified value in the Parameter Server module |
| PSUpdate (key, update) | Logical Executor | System | Applies an incremental update to a specified value in the Parameter Server module |

In various embodiments, the system's API module 212 allows ML programs 214 to have advanced optimization such as model scheduling and bounded staleness. The API module 212 allows ML programs 214 to specify dependencies 256 between micro-tasks 230, and dynamically dispatch micro-tasks 230 whenever the ML-program 214 specified dependencies 256 are satisfied at run-time with the following system guarantees (consistency model 262): if micro-task A is a dependency for micro-task B, then (1) A is executed before B is executed, and (2) B sees all changes to executor and parameter server state made by A. This strict ordering and consistency guarantee lets the ML programs 214 perform model scheduling by defining an order for which certain updates are calculated and applied. On the other hand, if neither A nor B is a dependency of for the other, then they may be executed in any order or in parallel, and may see none some, or all of the updates made by the other. This non-determinism lets the system 10 exploit the error-tolerance property of ML programs 214 by allowing the system's run-time system 300 (FIG. 6) to cache or use stale model parameter 224 values from the parameter server module 206 between independent micro-tasks 230, thus micro-task A can use cached updates of micro-task B, provided the staleness of the updates values are within a certain limit or bound.

Parameter Server Module: In various embodiments, the PS module 206 creates a set of logical servers (LSes) 210, which are in turn mapped to physical memory on each physical computing unit 218. This separation enables elasticity by allowing LSes 210 to be migrated to physical memory as it becomes available. The PS module statically hash-partitions the model parameter values 224, based on their key 225 into the LSes 210. This also allows ML programs to have a distributed shared memory, so that the ML program's state (or model parameters) 234 stored in the parameter server module 206 can be accessed from any physical computing unit 218 of the distributed computing system 220. In various embodiments, this is done via a key-value database API method or interface 238, which in various embodiments is a part of the application programming interface module 212.

The benefit of the PS module 206 is to abstract consistency management and networking operations away from the ML program 214, and present a key-value interface 238. A Get( ) function (e.g., PSGet ( ) 252) is used to read model parameters 224, and an Inc( ) function (e.g., PSUpdate( ) 254) is used to increment the model parameter 224 by some delta. In order to exploit locality in ML programs 214 and thus amortize the overhead of operating a concurrent data structures and network messaging, the ML programmer will partition the model state (or ML program state) 234 across keys 225, whose corresponding values are a set of model parameters values 224 that are usually accessed together. These key-value pairs 236 are the smallest unit of communication between LEs 208 and LSes 210.

When an LS 210 is transferred from one physical computing unit 218 to another, a LE 208 may request for a key-value pair 236 in the original physical computing unit 218, which no longer holds the key-value pair 236. This is addressed by having each LS 210 perform request forwarding: when an LS 210 receives a request for a key-value pair 236 it no longer holds, it forwards the request to the physical computing unit 218 with the relevant LS 210, which in various embodiments is the last LS 210 it has forwarded the key-value pair 236.

In order to eliminate redundant network usage, each LS 210 in the PS module 206 is able to cache previously fetched values locally, and serve values from the cache instead. The PS module uses the following cache coherence protocol 264: (1) Cache Coherence Protocol Rule 1: If the ML program 214 dispatches task B before being informed of the completion of task A, the PS module 206 assumes that task B does not depend on any updates made by task A. In this case, task B may see none, some, or all of the updates from A. (2) Cache Coherence Protocol Rule 2: If the ML program 214 dispatches task B after being informed of the completion of task A, the PS module 206 assumes that task B depends on all updates made by task A. In this case, task B will see all updates made by task A.

Figure 7:
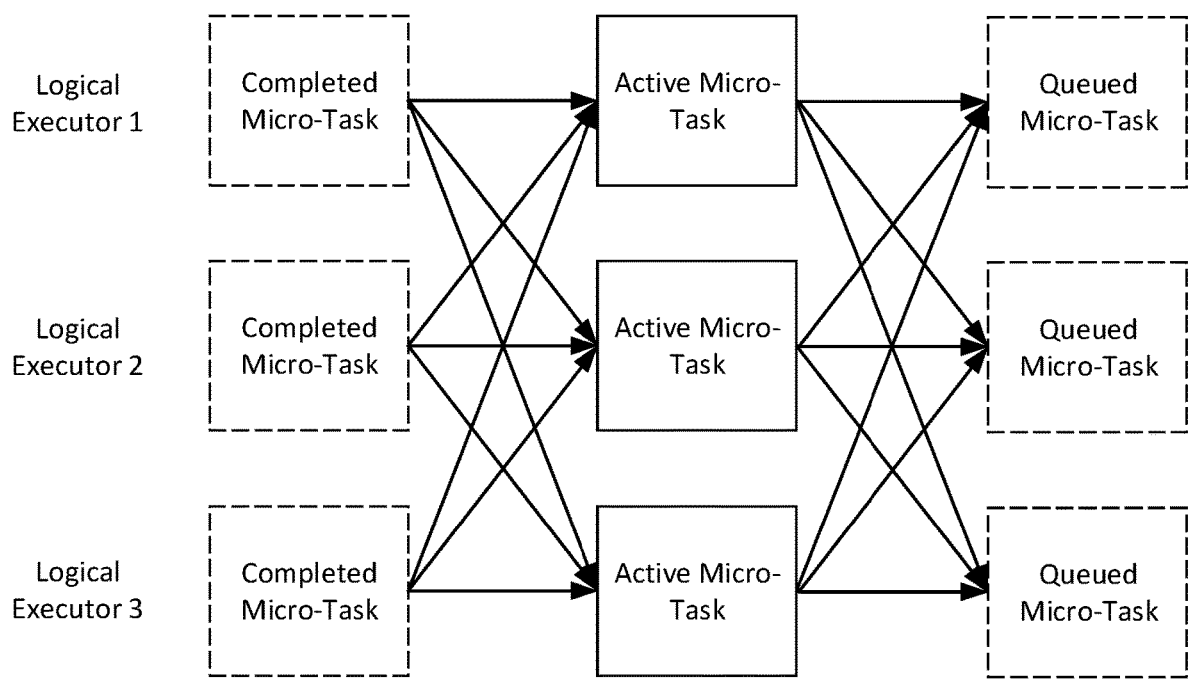
FIG. 7 is schematic diagram illustrating a bulk synchronous parallel execution standard according to various embodiments, where (1) if micro-task A and micro-task B are not dependency of each other, A and B can be executed in parallel, (2) if micro-task A is a dependency for micro-task B, B is executed after A is executed.
Figure 8:
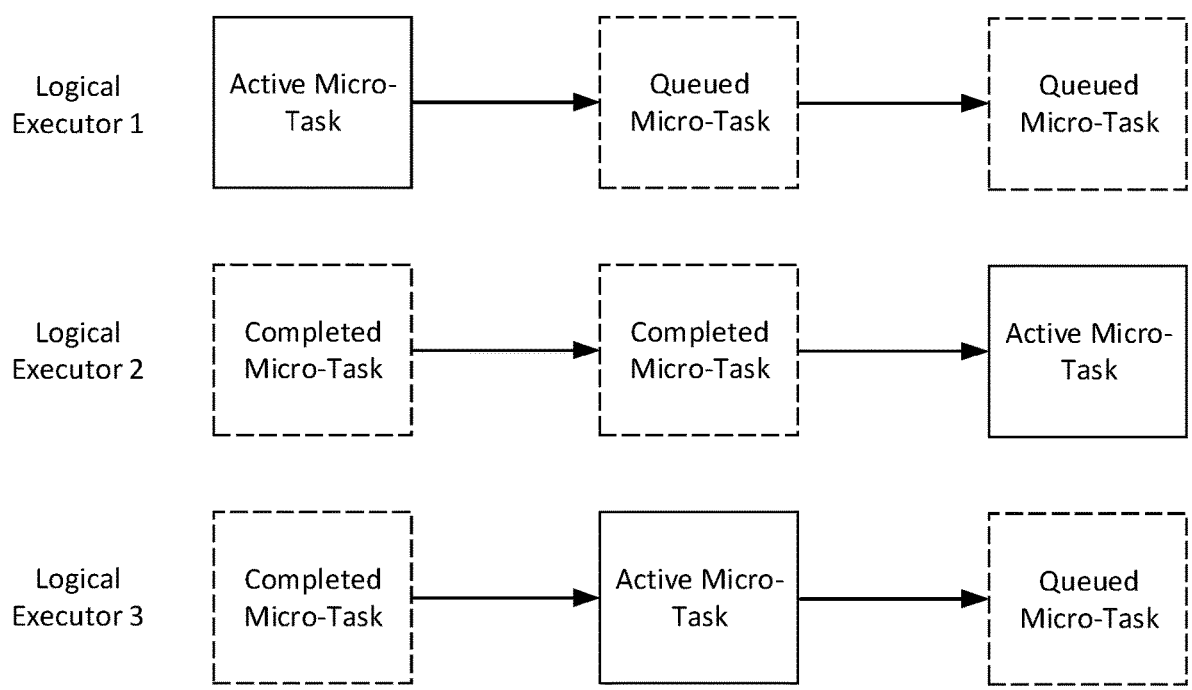

Bulk Synchronous Parallel & Bulk Asynchronous Parallel: This cache coherence protocol 264 allows the PS module 206 to support two standards of executing ML programs 214: (1) Bulk Synchronous Parallel (BSP) (FIG. 7): The BSP execution standard ensures correct ML program 214 execution; it requires all updates computed by previous tasks 230 to be made visible before the current task 230 starts. This is achieved by ensuring that a task B that depends on task A is never dispatched before A completes. (2) Bounded Asynchronous Parallel (BAP) (FIG. 8): The BAP execution standard enables the majority of ML program 214 operations to execute faster on datacenters, without compromising ML program 214 correctness; it allows the current task 230 to proceed without visibility of all updates computed by previous tasks 230 (or tasks it is a dependency of). This is achieved by allowing a task B that depends on task A to be dispatched before A completes.

BAP is advantageous for ML programs 214 running on a distributed computing system 220 such as a datacenter or cloud, because it allows them to finish execution substantially faster. This is because: (1) BAP negates slowdowns due to stragglers (or slow jobs that impedes job completion), which are individual physical computing units 218 that are running momentarily slower for reasons such as uneven computational and networking load, or distributed computing system environmental factors such as heat and vibration; (2) BAP allows for more update batching or coalesce, thus reducing the network bandwidth required by an ML program. Network bandwidth is always a bottleneck factor in distributed ML program 214 execution, being hundreds to thousands of times slower than CPU computation. BAP is workable for distributed ML computation because of the relaxed synchronization requirement of ML computation as discussed before, BAP standard can be employed if the staleness of the model parameter values is within a certain limit or bound. In various embodiments, this limit or bound can be user defined.

At the same time, BSP is needed for certain ML program 214 operations that require precise synchronization, one example being proximal or projection operations in optimization-based ML programs. BSP also allows the system to support more classes of programs beyond ML programs, such as Map-Reduce programs and database programs.

In various embodiments, the system 10 can, at a given time, tolerate executing greater than approximately 5%, 10%, 15%, 20%, 25%, 30%, 35%, 40%, 45%, 50%, 55%, 60%, 65%, 70%, 75%, 80%, 85%, 90%, 95%, and/or 100% of micro-tasks 230 of ML program 214 being executed at that time in BAP without collapsing.

Model Scheduling and Bounded Staleness: The inventive system 10 enables both model scheduling (via BSP) and bounded staleness (via BAP) in the distributed ML program execution by letting the ML program 214 specify dependencies 256 between micro-tasks 230 which in some embodiments is accomplished through a third-party routine stored in or called by the API module 212. In various embodiments, the API module 212 constructs a dependency graph 258 based on the ML program specified dependencies 256.

During execution, the system 10 (e.g., the driver module 204), follows the following model scheduling protocol 260: If micro-task A is a dependency for micro-task B, then (1) A is executed before B and (2) B sees all updates made by A. This strict ordering and consistency guarantee lets the ML program 214 perform model scheduling by defining an ordering (e.g. dependencies 256) for when certain updates are calculated and applied. On the other hand, if neither A nor B is a dependency for the other, then they may be executed in any order or in parallel, and may see none, some, or all of the updates made by the other. This critical piece of non-determinism lets the system exploits the error-tolerance property of ML program 214 by allowing the run-time system 300 of the system 10 to cache and use stale values from the parameter server module 206 between independent micro-tasks 230.

A generic way to specify dependencies between micro-tasks is through a dependency graph. A dependency graph is a directed graph in which each vertex corresponds to a micro-task, and an arc (or line) from vertex A to vertex B means micro-task A is a dependency for micro-task B. Due to the potential existence of a large number of micro-tasks, explicitly specifying a dependency graph may incur a significant amount of overhead. Instead, in various embodiments of the present invention, the system 10 implicitly specifies dependencies by dynamically dispatching a micro-task 230 of a ML program 214 whenever its dependencies 256 specified by the ML program 214, are satisfied during run-time. In various embodiments, the ML program 214 defines a driver module 204 which is responsible for dispatching micro-tasks 230 via the DispatchTask API method 246. In various embodiments, the application programming interface module 212 constructs and stored one or more dependency graphs 258 constructed based on the dependencies 256 specified by the ML programs 214. In various embodiments, whenever a micro-task 230 completes, the framework 200 informs the ML program 214 by invoking the HandleTaskCompletion API method 244 on the driver module 204, which can then dispatch any additional micro-tasks 230. Upon start, the framework 200 invokes the DispatchInitialTasks API method 242 on the driver module 204 so the ML program 214 can dispatch an initial set of micro-tasks 230 that do not have any dependencies.

With respect to its dispatch/inform API methods (242, 244, 246), the consistency model or protocol 262 of the inventive framework 200 guarantees to the ML program 214 is as follows: (1) If the driver dispatches micro-task B after being informed of the completion of micro-task A, then the inventive framework assumes that A is a dependency for B. In this case, B will see all updates made by A. (2) If the driver dispatches micro-task B before being informed of the completion of micro-task A, then the inventive framework assumes that A is not a dependency for B. In this case, B may see none, some, or all of the updates from A.

In other words, the inventive framework 200 lets the ML program 214 dynamically dispatch micro-tasks 230, infers dependencies between them from the sequence of DispatchTask and HandleTaskCompletion API methods or calls, and enforces its consistency model 262 based on those inferred dependencies. How this consistency model 262, along with a corresponding cache coherence protocol 264, can be implemented efficiently is discussed below.

Driver Module: The driver (D) module 204 coordinates the execution of the ML program 214 in two ways: (1) the D module 204 runs a task dispatcher that receives Work Tasks (WTs) 226 from ML programs 214, and sends them to LEs 208 (e.g, as micro-tasks 230) to be completed; (2) the D module 204 maintains the dynamic mappings between micro-tasks 230 and LEs 208 and between LEs 208 and physical computing units 218; (3) the D module 204 maintains the dynamic mappings between key-value pairs 236 and LS 210 inside the PS module 206 and between LSes 210 and physical computing units 218. When LEs 208 or LSes 210 are created or destroyed, the D module 204 initiates load re-distribution by sending requests to transfer partitioned WTs (micro-tasks) 226 between LEs 208, or key-value pairs 236 containing keys 225 and corresponding model parameters 224 between LSes 224. The D module 204 periodically triggers a checkpoint to be taken of the entire ML program state 234 (e.g., current values of model parameters 224), and automatically restores it upon any failure.

Elastic Resource Management: During an elasticity event, defined as the addition (or removal) of physical computing units 218 to the ML program 214, the Work Tasks 226 must be re-balanced. The D module 204 achieves this by moving micro-tasks 230, input data 228 and internal state 232 of some LEs 208 from over-loaded physical computing units 218 to under-loaded physical computing units 218. After transferring the micro-tasks 230, input data 228 and state 232 of an LE 208, the computation can continue on the transferred-to physical computing unit 218.

The load of a physical computing unit 218 is determined by the number of LEs 208 assigned to it. In order to achieve more balanced load for various numbers of physical computing units 218, the D module 204 launches an ML program 214 with a large number of LEs 208 (by creating a large number of LEs), partitioning the ML program's state 234 and WTs 226 into a large number of parallel units, and assign them to individual LEs 208 created.

In various embodiments, when an LE 208 needs to be moved or migrated, the D module 204 first waits until the LE 208 has finished processing its current task 230, then initiates a transfer of its internal state 232. The LE 208 is prevented from taking on further computational tasks 230 until the transfer is completed.

In various embodiments, to prevent LE 208 transfer or migration from holding up other computational tasks, the D module 204 employs a bounded staleness mode of execution (e.g., via BAP). Each LE 208 may have several tasks queued up, and the LE 208 is allowed to work ahead on any of these tasks 230 without waiting for tasks 230 on other LEs 208 to finish. The D module 204 prioritizes transfer of LEs 208 that have the fewest outstanding tasks 230 to be completed.

In various embodiments, when a new physical computing unit 218 joins the ML program 214 computation, (1) new LEs 208 and LSs 210 are created on the new physical computing unit 218 and tracked by the D module 204 and the PS module 206 respectively, (2) micro-tasks 230 are selected from existing LEs 208 in the system 10, and the D module 204 suspends their execution, (3) the selected micro-tasks 230 and their internal state 232 and data 228 are moved to the new LE 208, so as to maintain the same number of micro-tasks 230 on each LE 208, (4) key-value pairs 236 are selected from existing LSes 210 in the system 10, and moved to the new LSes 210, the selected existing LSes 210 set up request forwarding for the moved key-value pairs 236, (5) the D module 204 restarts the suspended micro-tasks 230.

In various embodiments, when an existing physical computing unit 218 leaves the ML program 214 computation, (1) the D module 204 suspends execution of micro-tasks 230 from the leaving physical computing 218 unit's LEs 208, (2) the suspended micro-tasks 230 and their internal state 232 are moved to the remaining LEs 208 on other physical computing units 218 of the system 10, so as to maintain the same number of micro-tasks 230 on each LE 208, data 228 on the leaving physical computing unit 218 is not transferred, but is instead re-loaded at the destination LEs 208, (3) key-value pairs 236 from the leaving physical computing unit's 218 LSes 210 are moved to the remaining LSes 210 on other physical computing units 218, (4) the D module 204 stops tracking the leaving physical computing unit's LEs 208, and the PS module 206 stops tracking the leaving physical computing unit's LSes 210, and (5) the D module 204 restarts the suspended micro-tasks 230.

In various embodiments, when the system 10 needs to create a recovery checkpoint, the D module 204 will suspend execution of the ML program 214 by waiting for all the LEs 208 to finish their current tasks 230, and pauses all queued tasks 230 from each LE 208. The D module 204 takes a checkpoint consisting of: (1) a copy of the D module's state, (2) copies of the task queue for each LE; (3) serialized copies of each LE's internal state; (4) serialized copies of each LSes key-value pairs 236.

Figure 6:
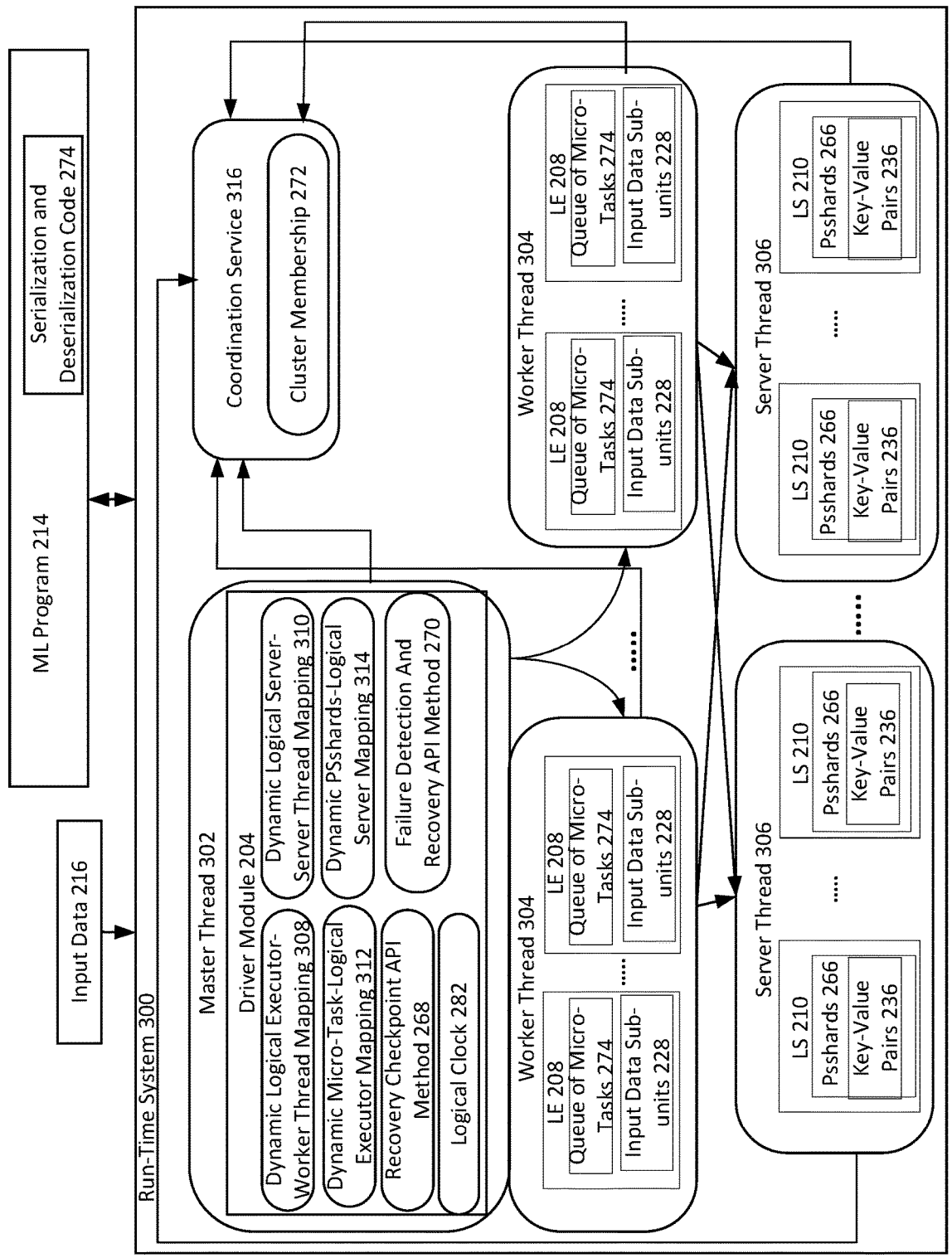
FIG. 6 is a schematic diagram illustrating a run-time system of the system of FIG. 1 according to various embodiments.

In various embodiments, failures in the system 10 are detected using a heartbeat mechanism. Each physical computing unit 218 sends periodic heartbeat messages to the D module 204, which keeps track of all physical computing unit 218, through for example an external coordination service 316 (FIG. 6). A physical computing unit 218 is assumed to have failed if a heartbeat message has not been received for an extended amount of time. The D module then initiates the recovery process, by restoring from the checkpoint.

Example Implementation: In various embodiments, the inventive system 10 is implemented in approximately 6500 lines of C++ code using the ZeroMQ library for low latency communication and Boost's Coroutine2 library for low overhead context-switching between micro-tasks 230. In various embodiments, the run-time system 300 of the system 10 is comprised of a single master thread 302 along with a collection of worker threads 304 and server threads 306, as shown in FIG. 6.

The driver module 204 exists in the master thread 302 and its logical executors 208 exist in the worker threads 304. The key-value pairs 236 comprising the model parameters 224 are partitioned and distributed across a set of logical parameter server shards (PSshards) 266 and stored across logical servers 210 which reside in the server threads 306. In various embodiments, PSshards 266 is the logical servers 210. Additional worker threads 304 and server threads 306 may join at any time during the computation, and the run-time system 300 can re-distribute its load (e.g. micro-tasks 230, PSshards 266) to make use of them. They may also gracefully leave the computation after signaling to the master thread 302 and allowing their load to be transferred to other threads.

The driver module 204 in the master thread 302 dispatches micro-tasks 230 to be performed by logical executors 208 on the worker threads 304. Logical executors 208 can read and update the global model parameters 244 distributed across logical servers 210 residing on the server threads 306.

The master thread 302 coordinates the execution of the ML program 214. First, it obtains micro-tasks 230 from the driver module 204 by initially invoking the DispatchInitialTasks API method 242 and then continuously calling the HandleTaskCompletion API method 244, sending the micro-tasks 230 to worker threads 304 to be executed. Second, the master thread 302 maintains the dynamic logical executor to worker thread mappings 308 between logical executors 208 and worker threads 304, as well as dynamic logical server to server thread mapping 310 between logical servers 210 and server threads 306. In various embodiments, the master thread 302 also maintains the dynamic micro-task to logical executor mapping 312 between micro-tasks 230 and logical executors 208, as well as dynamic PSshard to logical server mapping 314 between PSshards 266 and logical servers 210. In various embodiments, PSshards 266 are the same as logical servers 210, and the dynamic logical server to server thread mapping 310 and the dynamic PSshard to logical server mapping 314 are the same mapping. When worker threads 304 or server threads 306 join or leave the computation, the master thread 302 initiates load re-distribution by sending commands to move micro-tasks 230 and/or logical executors 208 between worker threads 304 or PSshards 266 and/or logical servers 210 between server threads 306. Third, the master thread 302 periodically triggers a recovery checkpoint routine or API method 268 to be taken of the entire application state 234 of the ML program 214, and automatically restores it using a failure detection and recovery routine or API method 270 when a failure is detected. Each thread (master thread 302, worker thread 304, or server thread 306) registers with an external coordination service 316 such as ZooKeeper or etcd in order to determine cluster membership 272 (which groups worker nodes such as logical executors and logical servers into clusters) and detect failures. In order to for the driver module 204 to transfer and checkpoint logical executors 208, the inventive framework 200 requires the ML program 214 to provide serialization and de-serialization code 274. The programming burden on the developer is low since (1) this code does not actively participate in elasticity and checkpointing, but simply invoked by the run-time system 300 whenever needed, and (2) various third-party libraries can be used to generate serialization and de-serialization code 274, such as Boost Serialization, to reduce programming overhead.

Each worker thread 304 maintains the state of and runs of the micro-tasks 230 for a subset of all logical executors 208 (e.g., LE assigned to the work thread 304). After any worker threads 304 join the active computation, logical executors 208 are moved to them from the existing worker threads 304 (termed "scale out" or "scale up"). Similarly, before any worker threads 304 leave the active computation, logical executors 208 are moved from them to the remaining worker threads 304 (termed "scale in" or "scale down"). The inventive framework 200 aims to have roughly the same number of logical executors 208 residing on each worker thread 304, but can be modified to support load balancing using other measures of load. The measures of load are determined by the number of micro-tasks 230.

When a logical executor 208 needs to be moved, the master thread 302 first sends a command to its worker thread 304 instructing it to suspend execution of micro-tasks 230 for that logical executor 208. After receiving the command, the worker thread 304 finishes any ongoing micro-tasks 230 for that logical executor 208 while buffering any pending micro-tasks 230 dispatched by the driver module 204 that have not yet started. It then sends the logical executor's 208 application state 232 and its queue 276 of buffered micro-tasks 230 over the network 278 to the receiving worker thread 304.

The transfer of the logical executor's 208 input data (or input data sub-units) 228 is treated differently in the scale-in and scale-out cases. When scaling in, the inventive framework 200 aims to free the requested resources as quickly as possible. The LE's input data 228 is discarded on the originating worker thread 304 to avoid incurring extra network transfer time, and re-loaded on the target worker thread 304. When scaling out, the inventive framework 200 aims to make use of the new worker thread 304 as quickly as possible. The input data 216 is sent directly from the memory of the originating worker thread 304 to avoid incurring extra disk read time on the target worker thread 304.

Similar to worker threads 304 and logical executors 204, each server thread 306 stores and handles the requests and updates for a subset of all PSshards 266, which are re-distributed in the PSshards 266 in the parameter server module 206 before scaling in and after scaling out. However, since requests and updates are continuously being sent to each PSshard 266 and can originate from any logical executor 208, their transfer requires a special care. In particular, a worker thread 304 may send requests or updates to a server thread 306 that no longer contains the target PSshard 266, which can occur if the PSshard 266 has been moved but the worker thread 304 has not yet been notified.

A naive solution to this problem is to suspend micro-tasks 230 on every logical executors 208, then perform the transfer, notify all worker threads 304 of the change, and finally resume execution. This method guarantees that worker threads 304 always send requests and updates to server threads 306 that contain the target PSshard 266, but requires suspending the execution of the entire system 10.

Instead, in various embodiments of the inventive system 10, the server threads 306 perform request and update forwarding amongst each other. Whenever a server thread 306 receives a request for or update to a value on a PSshard 266 it no longer contains, it forwards the message to the server thread 306 it last transferred the PSshard 266 to. If the PSshard 266 is currently being transferred away, the server thread 306 buffers the requests and/or updates and forwards them after the transfer is completed. This can happen multiple times until the target PSshard 266 is found, the request/update is performed, and the response is sent back to the originating worker thread 304. The actual coordination of the transfer is handled between the master thread 302 and the server threads 306 independent of the worker threads 304 until they are notified of the transfer. This way, execution of micro-tasks 30 can proceed uninterrupted during parameter server module 206 scaling events.

When the system 10 needs to create a recovery checkpoint, the driver module 204 will suspend execution of the ML program 214 by waiting for all the LEs 208 to finish their current tasks 230, and pauses all queued tasks from each LE 208. The driver module 204 takes a checkpoint consisting of: (1) a copy of the driver module's 204 state, 2) copies of the Work Task queue 276 for each LE 208; (3) serialized copies of each LE's 208 internal state 232; (4) serialized copies of each LSes 206 key-value pairs 236.

Failures in the system 10 are detected using a heartbeat mechanism. Each physical computing unit 218 sends periodic heartbeat messages to the driver module 204, which keeps track of all physical computing units 218. A physical computing unit 218 is assumed to have failed if a heartbeat message has not been received for an extended amount of time. The driver module 204 then initiates the recovery process, by restoring from the checkpoint.

In various embodiments, to achieve fault tolerance, the run-time system 300 of the inventive framework 10 is able to periodically create and save a consistent checkpoint of the ML program's entire execution state 234. When a checkpoint is triggered, the master thread 302 suspends the execution of the ML program 214 by waiting for all the logical executors 208 to finish their current micro-tasks 230, and buffer any further micro-tasks 230. A checkpoint will then be taken, writing to persistent storage (1) the state of the driver module 204, (2) the buffered micro-tasks 230 for each logical executor 208, (3) the state 232 of each logical executor 208, and (4) the key-value pairs 236 stored in each PSshard 266. Input data 228 is not saved, but is re-loaded again during the recovery process. When a failure is detected through the external coordination service 316, the inventive framework 200 triggers an automatic recovery from the latest checkpoint. The saved driver module's 204 state, logical executors' 208 states, buffered micro-tasks 230, and parameter server module 206 values are loaded from persistent storage, after which normal execution is resumed.

The ML program 214 consistency model 262 outlined above exposes an opportunity for the run-time system 300 to optimize execution by caching and re-using locally cached values from the parameter server module 206 instead of retrieving them over the network 278 for each access. Specifically, a micro-task A is allowed to use a cached model parameter if its value reflects all updates made by all micro-tasks that A depends on. This means that (1) multiple accesses of the same parameter by micro-task A can use the same locally cached model parameter value and (2) a micro-task B whose dependencies are a subset of A's can use the same cached model parameter values that were used by A. The following discussion focuses on supporting (2) since (1) is just the specific case when A=B, thus the same mechanism that supports (2) will work for both cases.

Suppose a cached model parameter value 224 was retrieved by micro-task 230 A. In order to determine if it can be re-used by micro-task 230 B, a method is needed to quickly check if the dependencies of B are a subset of the dependencies of A. In the general case when dependencies are explicitly specified, performing this check for each access of a parameter value can incur a significant overhead. However, by only using the sequence of DispatchTask and HandleTaskCompletion calls to infer dependencies, the inventive framework 300 effectively reduces the number of possible combinations of micro-tasks 230 that can occur as dependencies. When a micro-task 230 is dispatched, all other micro-tasks 230 whose completion the Driver module 204 has been informed of are considered to be dependencies. Thus, the dependencies of micro-task B are a subset of the dependencies of micro-task A if the total number of HandleTaskCompletion calls made when B was dispatched is at most the total number of HandleTaskCompletion calls made when A was dispatched.

This cache coherence protocol 264 can be implemented with low overhead. The master thread 302 maintains a single logical clock 282 that is incremented each time HandleTaskCompletion is invoked. When the driver module 204 dispatches a micro-task 230 by invoking DispatchTask, the master thread 302 tags the micro-task with the clock at that time, which is called its parent clock. After micro-task A retrieves a fresh value from the Parameter server module 206, it caches the value tagged with its parent clock. When micro-task B wants to access the same parameter, it first checks if its parent clock is less than or equal to the clock tagged to the cached value. If so, then the cached value is used; otherwise a fresh copy of the parameter is retrieved from the parameter server module 206 and tagged with B's parent clock. A cache exists on each the inventive framework 300 process running at least one worker thread 304, so that it can be shared between different worker threads 304 in the same process.

This cache coherence protocol 264 allows the inventive framework 300 to automatically take advantage of parameter caching for ML programs 214 that use bounded staleness. For example, in SSP described above with staleness s, all micro-tasks for iteration i are dispatched when the last micro-task for iteration i−s−1 is completed. Thus, every micro-task 230 for the same iteration has the same parent clock and share cached parameter values with each other. Since the micro-tasks for iteration i are dispatched before the those for iterations between i−s and i−1 finish (when s≥1), the values they retrieve from the parameter server may not reflect all updates made in those prior iterations, allowing staleness in the parameter values being accessed.

Updates for the same parameter value 224 may be generated many times by the same micro-task 230, and by many different micro-tasks 230. Since the parameter updates in ML programs 214 are incremental and almost always additive, they can be aggregated locally before sending to the parameter server in order to reduce network usage. To facilitate the aggregation of updates, each the inventive framework 200 process that runs at least one worker thread 304 also contains an update log which is stored as a mapping from parameter keys 225 to aggregated updates. Whenever a micro-task 230 updates a parameter value 224 by invoking PSUpdate, the given update is aggregated into the corresponding entry in the update log or table, or is inserted into the update log if the corresponding entry does not exist. Therefore, an update sent to the parameter server module 206 can be a combination of many updates generated by different micro-tasks 230 on the same the inventive framework process.

In order to maximize the number of updates that are locally aggregated before sending them over the network 318, the results of micro-tasks 230 are not immediately returned to the master thread 302 after they are completed. Instead, when a micro-task 230 completes, its updates remain in the update log and the result of the micro-task 230 is buffered to be returned to the master thread 302 at a later time. Doing this allows the updates from multiple micro-tasks 230 to be sent in aggregated form to the server threads 306, reducing total network usage. The update log is periodically flushed by sending all updates it contains to the server threads 306 to be applied. After each flush, all buffered micro-task 230 results are returned to the master thread 302, which then informs the driver module 204 of their completion. The period of flushing is a parameter that can be carefully tuned. We find that the simple strategy of flushing only when all micro-tasks 230 on a worker thread 304 are finished works well in practice.

To efficiently execute many micro-tasks 230 on each worker thread 302, the inventive framework 200 employs co-operative multitasking implemented with a co-routine library in the Application programming interface module 212. When one mico-task 230 is blocked in an invocation of PSGet waiting for a value to be returned from a server thread 306, the worker thread 304 will switch to executing another micro-task 230 that is not blocked so that useful work is still performed. Each micro-task 230 is executed within a co-routine so that switching between them can be done with low-latency, entirely in user-space. Using co-routines provides the benefit of overlapping communication with computation, while retaining a simple-to-use, synchronous interface for accessing the parameter server module 206 from micro-tasks 230.

Figure 9:
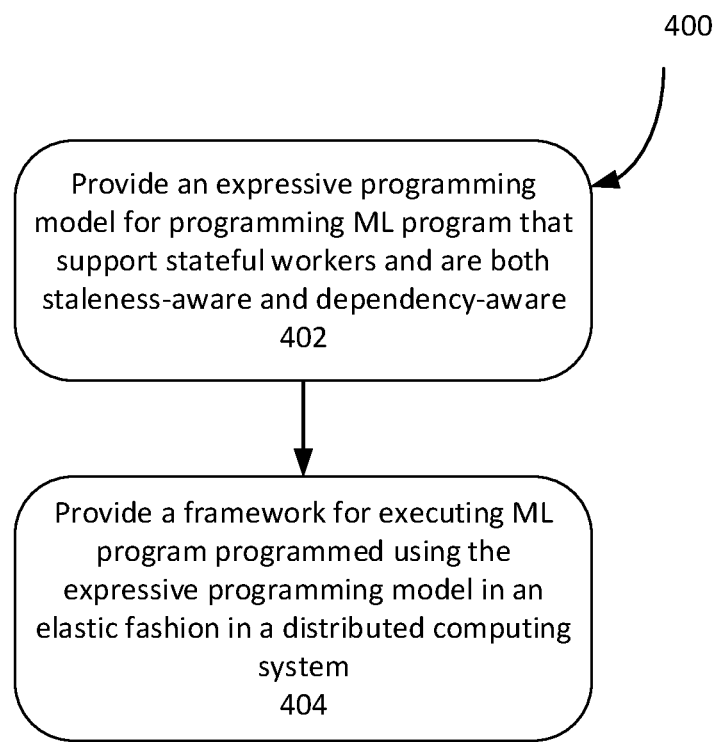
FIG. 9 is a schematic diagram illustrating a method implemented by the herein disclosed inventive system for elastic resource management of distributed machine learning computation according to some embodiments.

FIG. 9 illustrates an example method 400 for executing a distributed ML program (e.g., ML program 214). The method 400 can be implemented using the herein disclosed inventive system 10 according various embodiments. The method includes: At Step 402, providing an expressive programming model such as expressive programming model 100 for programming or modifying a ML program that supports stateful workers (e.g. logical executors 208) and are both update staleness-aware and task dependency-aware. At Step 404, providing a framework such as framework 200 for executing the ML program built with the expressive programming model 100 in an elastic fashion in a distributed computing system.

Figure 10:
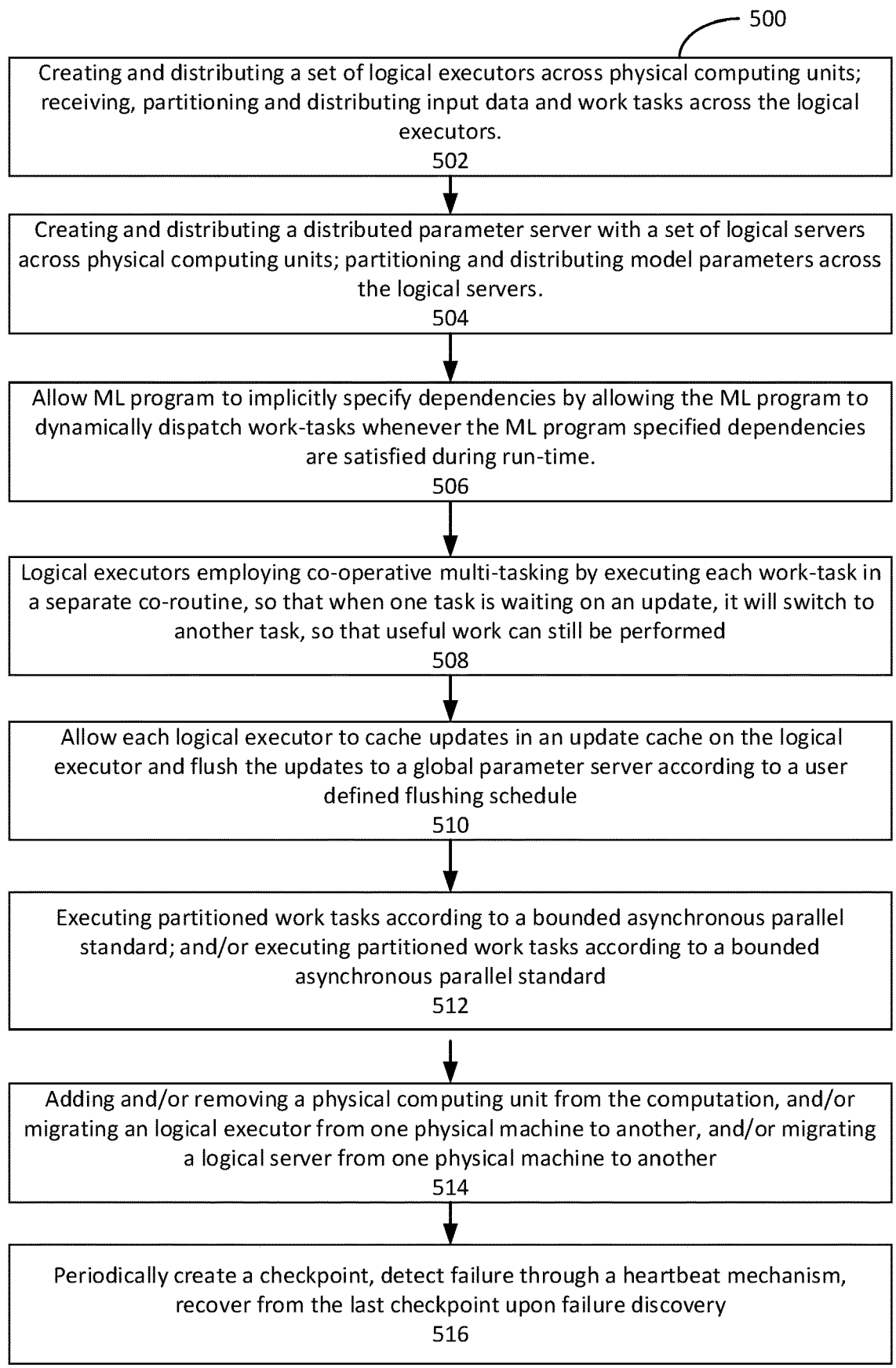
FIG. 10 is a schematic diagram illustrating a method implemented by the herein disclosed inventive system for elastic resource management of distributed machine learning computation according to some embodiments.

FIG. 10 illustrates an example method 500 for executing a ML program (e.g., ML program 214) in a distributed computing system (e.g., distributed computing system 220), the method 500 can be implemented using the herein disclosed inventive system 10 according various embodiments. One or more steps recited here may be omitted, altered, and/or additional steps may be inserted in accordance to the teachings of the present invention. The method 500 includes:

At Step 502, create a set of logical executors (e.g., logical executors 208) for performing the computation of the ML program in a divide-and-conquer fashion, assigning a set of physical computation units (e.g., physical computing unit 218) for performing the computation, distribute the logical executors across the set of physical computation units of the distributed computing system, partitioning input data (e.g., input data 216) into small input data sub-units (e.g., input data sub-units 218) and partitioning Work Tasks (e.g., Work Tasks 226) of the ML program into micro-tasks (e.g., micro-tasks 230), distributing input data sub-units and micro-tasks across the set of logical executors At Step 504, create a global parameter server (e.g., PS module 206) comprising a set of logical servers (e.g., logical servers 210) for storing globally shared model parameters (e.g., model parameters 224) of the ML program, distribute the set of logical servers across the physical computation units of the distributed computing system, partitioning the globally shared model parameters into small shards (e.g., PSshards 266) and distributing them across the set of logical servers, At Step 506, allow ML program to implicitly specify dependencies (e.g., dependencies 256) by allowing the ML program to dynamically dispatch Work Tasks whenever the ML program specified dependencies are satisfied during run-time.

At Step 508, logical executors employ co-operative multi-tasking by executing each Work Task in a separate co-routine, so that when one task is waiting for an update, it will switch to another task, so that useful work can still be performed.

At Step 510, allow each logical executor to cache updates in an update cache (e.g., update cache 280) on the logical executor and flush the updates to the global parameter server (e.g., parameter server 206) according to a user defined parameter.

At Step 512, execute partitioned Work Tasks (e.g., micro-tasks 230) according to a bounded asynchronous parallel standard; and/or execute partitioned Work Tasks according to a bounded asynchronous parallel standard.

At Step 514, add/or remove a physical computing unit from the computation, and/or migrate a logical executor from one physical computing unit to another, and/or migrate a logical server from one physical computing unit to another physical computing unit.

Figure 11:
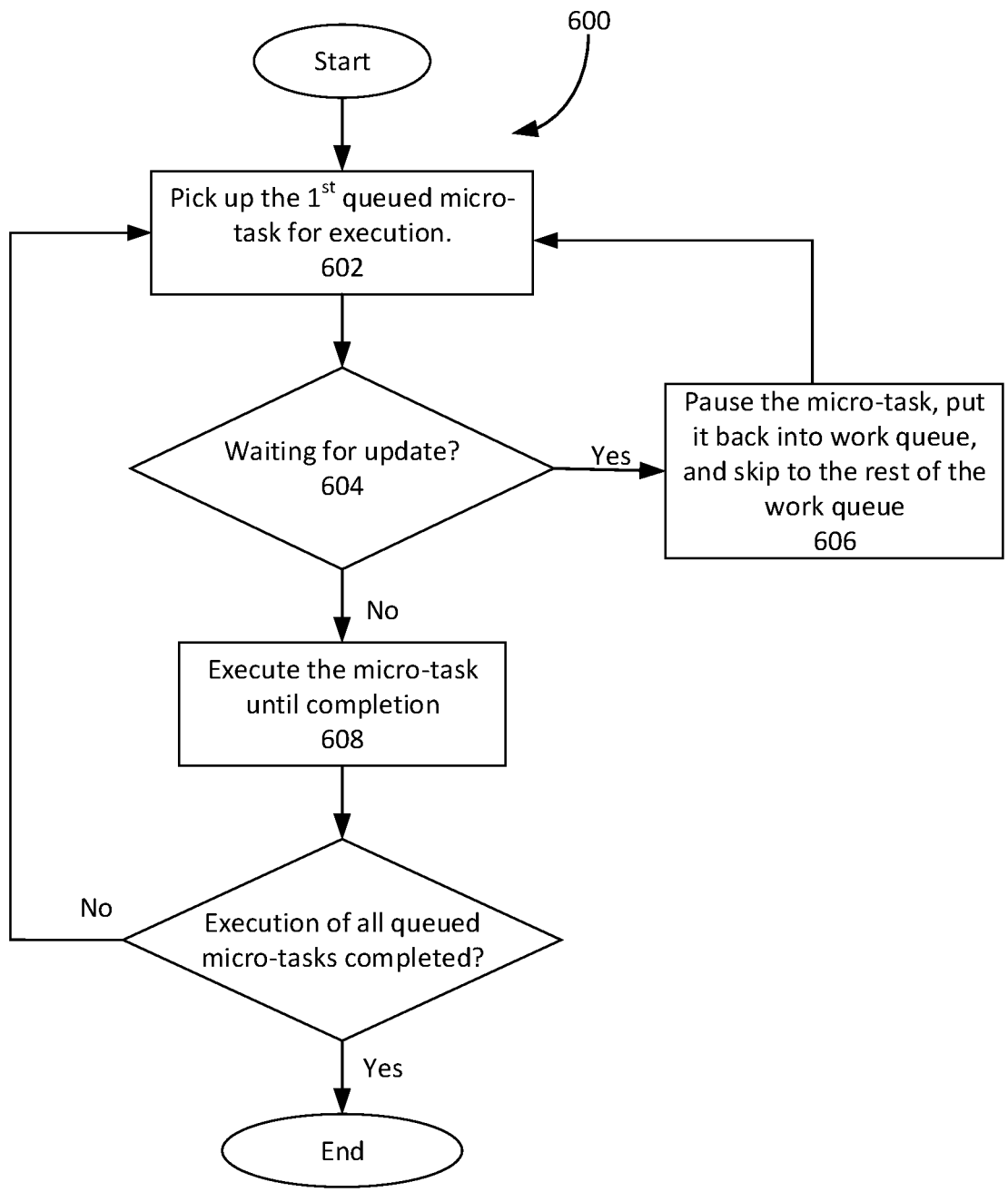
FIG. 11 is a schematic diagram illustrating a co-operative multi-tasking execution method implemented by a logical server for elastic resource management of distributed machine learning computation according to some embodiments.

At Step 516, periodically create a recovery checkpoint using a heartbeat mechanism, recover from the last recovery checkpoint upon failure discovery FIG. 11 illustrates an example co-operative multi-tasking routine 600 for executing queued micro-tasks (e.g., work queue 276) in a logical server (e.g., logical server 210) according to various embodiments. The routine 600 comprises the steps:

At Step 602, pick up the first micro-task (e.g., micro-task 230) for execution.

At Step 604, if execution of the micro-task needs updates from other micro-tasks, the routine proceeds to Step 602, otherwise, the routine proceeds to Step 604.

At 606, execute the micro-task until completion. The routine ends if execution of all queued micro-tasks are completed, otherwise the routine proceeds to Step 602.

The above aspect of the present invention is embodied as systems and methods for executing machine ML algorithms in a distributed computing environment. Other embodiments of this aspect include corresponding apparatuses, devices, firmware, hardware, and/or software recorded on one or more computer storage devices, each or in combination configured to implement the systems and methods of the present invention.

It should be noted, although the present invention is discussed in relation to elastic resource management of ML programs, it is possible the present invention can be applied to other distributed software programs that have the same or similar traits as that of the distributed ML programs mentioned above that motivated the present invention.

It is noted that embodiments of the inventive subject matter may be referred to, individually and/or collectively, herein by the term "system", "method", "technique", "solution", "invention", "inventive system", "inventive method", "inventive technique", "inventive solution", "inventive solution", and/or "inventive system", in their singular forms or plural forms, merely for convenience and without intending to voluntarily limit the scope of this application to any single invention or inventive concept if more than one is in fact disclosed.

It is noted that each term used herein refers to that which an ordinary artisan in the relevant art would understand such term to mean based on the contextual use of such term herein. To the extent that the meaning of a term used herein, as understood by an ordinary artisan based on the contextual use of such term, differs in any way from any particular dictionary definition of such term, it is intended that the meaning of the term as understood by the ordinary artisan would prevail.

It is noted that, as used herein, "a" and "an" each generally denotes "at least one," but does not exclude a plurality unless the contextual use dictates otherwise. Thus, reference to "a device having a widget" describes "a device having at least one widget" as well as "a device having widgets." In contrast, reference to "a device having a single widget" describes "a device having only one widget."

Furthermore, as used herein, "and" denotes "all of the items of the list." Thus, reference to "a car having a smooth wheels and spiked wheels" describes "a car having smooth wheels, wherein the car further has spiked wheels," as well as describes "a car having spiked wheels, wherein the car further has smooth wheels."

The subject matter of the present disclosure includes all novel and nonobvious combinations and sub-combinations of the various systems, processes, devices, configures, features, functions, characteristics, and/or properties disclosed herein, as well as all equivalents thereof.

Any embodiment discussed and identified as being "preferred" is considered to be a part of a best mode contemplated for carrying out the present invention. Other embodiments also may be discussed for additional illustrative purposes in providing a full and enabling disclosure of the present invention. Moreover, any embodiments, such as adaptations, variations, modifications, and equivalent arrangements, will be implicitly disclosed herein and fall within the scope of the present invention.

The scope of the patent protection is defined by the claims and the equivalents thereof, it is not intended to be defined by reading into any limitation found herein that does not explicitly appear in a claim itself.

What is claimed:

1. A computer implemented method for elastic resource management for executing a machine learning (ML) program, comprising: creating a set of logical executors, assigning them across a set of networked physical computation units of a distributed computing system, receiving, partitioning and distributing input data and Work Tasks across the set of logical executors; creating a set of logical servers (LSes), assigning them across the set of networked physical computation units, partitioning and distributing globally shared model parameters of the ML program across the set of logical servers; executing partitioned Work Tasks according to a bounded asynchronous parallel standard, where a current Work Task is allowed to execute with stale model parameters without having one or more current calculation updates from Work Tasks it depend on, provided the stale model parameters is within a predefined limit, wherein the Work Tasks are partitioned into short units of computation (micro-tasks), each of the micro-tasks calculates a partial update to the ML program's model parameters and each of the micro-tasks last for less than one second; and periodically creating a recovery checkpoint by suspending execution of the ML program by waiting for all the LEs to finish their current micro-tasks, pausing all queued micro-tasks on each LE, then taking (1) a copy of a driver that controls micro-task scheduling, (2) copies of the task queue for each LE, (3) serialized copies of each LE's internal state, (4) serialized copies of the model parameter key-value pairs on each LS.

2. The method of claim 1, further comprising: providing ready-made codes for programming or modifying the ML program to allow the ML program to define and keep track of individual LE's state, define dependencies for its micro-tasks, modify each calculation update with a staleness factor that one or more calculation update experiences, and dynamically dispatch micro-tasks according to self-specified dependencies at run-time.

3. The method of claim 1, further comprising: executing micro-tasks according to a bulk synchronous parallel standard, where computation updates made by all micro-tasks a current micro-task depend on are required to be made visible to the current micro-task before it can be executed.

4. The method of claim 1, wherein at least 20% of the time for executing the ML program, at least 20% of the micro-tasks are executed according to the bounded asynchronous parallel standard.

5. The method of claim 1, further comprising: migrating an LE from one physical computing unit to another physical computing unit, where during the migration, prevent the LE from taking on further micro-tasks until the migration is completed, wait until the LE has finished processing its current micro-task, moving an input data and an internal state of the LE to the physical computing unit the LE is migrating to, allowing LEs that depend from the migrating LE to execute without waiting for the micro-tasks on the migrating LE to finish.

6. The method of claim 1, further comprising: adding a new physical computing unit to the execution by creating new LEs on the new physical computing unit, migrating a set of existing LEs to the new physical computing unit.

7. The method of claim 6, further comprising: creating a set of LSes on the new physical computing unit, migrating a set of existing LSes comprising a set of model parameters to the new physical computing unit, setting up request forwarding for the migrated model parameters.

8. The method of claim 1, further comprising: removing a physical computing unit from the execution by suspending the execution of micro-tasks on a leaving physical computing unit, moving the micro-tasks and the internal state of each LE on the leaving physical computing unit to one or more remaining computing units, re-loading the input data of the micro-tasks at a destination physical computing unit rather than transferring them from the leaving physical computing unit.

9. The method of claim 1, further comprising: maintaining a work queue of micro-tasks from the ML program at each LE, employing co-operative multitasking for performing the queue of micro-tasks, and coalescing its calculation updates from its micro-tasks into a local update cache for some time before flushing them to a globally shared parameter server.

10. A system for elastic resource management for executing a machine learning (ML) program, comprising: a set of physical computing units, each comprising a set of logical executors and a set of logical servers; an input data partitioning module; a parameter server module; an application programming interface; and a driver module; wherein the system is configured to perform the steps of: creating a set of logical executors, assigning them across a set of networked physical computation units of a distributed computing system, receiving, partitioning and distributing input data and Work Tasks across the set of logical executors; creating a set of logical servers (LSes), assigning them across the set of networked physical computation units, partitioning and distributing globally shared model parameters of the ML program across the set of logical servers; executing partitioned Work Tasks according to a bounded asynchronous parallel standard, where a current Work Task is allowed to execute with stale model parameters without having one or more current calculation updates from Work Tasks it depend on, provided the stale model parameters is within a predefined limit, wherein the Work Tasks are partitioned into short units of computation (micro-tasks), each of the micro-tasks calculates a partial update to the ML program's model parameters and each of the micro-tasks last for less than one second; and periodically creating a recovery checkpoint by suspending execution of the ML program by waiting for all the LEs to finish their current micro-tasks, pausing all queued micro-tasks on each LE, then taking (1) a copy of a driver that controls micro-task scheduling, (2) copies of the task queue for each LE, (3) serialized copies of each LE's internal state, (4) serialized copies of the model parameter key-value pairs on each LS.

11. The system of claim 10, wherein the system is further configured to perform the steps of: providing ready-made codes for programming or modifying the ML program to allow the ML program to define and keep track of individual LE's state, define dependencies for its micro-tasks, modify each calculation update with a staleness factor that one or more calculation update experiences, and dynamically dispatch micro-tasks according to self-specified dependencies at run-time.

12. The system of claim 10, wherein the system is further configured to perform the steps of: executing micro-tasks according to a bulk synchronous parallel standard, where computation updates made by all micro-tasks a current micro-task depend on are required to be made visible to the current micro-task before it can be executed.

13. The system of claim 10, wherein the system is further configured so that at least 20% of the time for executing the ML program, at least 20% of the micro-tasks are executed according to the bounded asynchronous parallel standard.

14. The system of claim 10, wherein the system is further configured to perform the steps of migrating an LE from one physical computing unit to another physical computing unit, where during the migration, prevent the LE from taking on further micro-tasks until the migration is completed, wait until the LE has finished processing its current micro-task, moving an input data and an internal state of the LE to the physical computing unit the LE is migrating to, allowing LEs that depend from the migrating LE to execute without waiting for the micro-tasks on the migrating LE to finish.

15. The system of claim 10, wherein the system is further configured to perform the steps of: adding a new physical computing unit to the execution by creating new LEs on the new physical computing unit, migrating a set of existing LEs to the new physical computing unit.

16. The system of claim 15, wherein the system is further configured to perform the steps of: creating a set of LSes on the new physical computing unit, migrating a set of existing LSes comprising a set of model parameters to the new physical computing unit, setting up request forwarding for the migrated model parameters.

17. The system of claim 10, wherein the system is further configured to perform the steps of: removing a physical computing unit from the execution by suspending the execution of micro-tasks on a leaving physical computing unit, moving the micro-tasks and the internal state of each LE on the leaving physical computing unit to one or more remaining computing units, re-loading the input data of the micro-tasks at a destination physical computing unit rather than transferring them from the leaving physical computing unit.

18. The system of claim 10, wherein the system is further configured to perform the steps of: maintaining a work queue of micro-tasks from the ML program at each LE, employing co-operative multitasking for performing the queue of micro-tasks, and coalescing its calculation updates from its micro-tasks into a local update cache for some time before flushing them to a globally shared parameter server.

* * * * *